US008678631B2

(12) United States Patent
Tominaga et al.

(10) Patent No.: US 8,678,631 B2
(45) Date of Patent: Mar. 25, 2014

(54) VEHICLE HEADLAMP ASSEMBLY WITH CONVECTION AIRFLOW CONTROLLING PLATE

(75) Inventors: Motonori Tominaga, Anjo (JP); Daisuke Nishitani, Kariya (JP); Takahiro Nakano, Kariya (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 198 days.

(21) Appl. No.: 13/065,757

(22) Filed: Mar. 29, 2011

(65) Prior Publication Data

US 2011/0242834 A1 Oct. 6, 2011

(30) Foreign Application Priority Data

Mar. 31, 2010 (JP) ................................ 2010-082209

(51) Int. Cl.
*B60Q 1/04* (2006.01)

(52) U.S. Cl.
USPC ........... 362/547; 362/507; 362/539; 362/294; 362/310

(58) Field of Classification Search
USPC ......... 362/507, 509, 538, 539, 547, 549, 294, 362/310
See application file for complete search history.

(56) References Cited

U.S. PATENT DOCUMENTS

| | | | | |
|---|---|---|---|---|
| 1,681,153 | A * | 8/1928 | Johnston | 362/294 |
| 7,114,837 | B2 * | 10/2006 | Yagi et al. | 362/523 |
| 7,300,191 | B2 * | 11/2007 | Oshio et al. | 362/545 |
| 7,329,033 | B2 * | 2/2008 | Glovatsky et al. | 362/547 |
| 7,621,664 | B2 * | 11/2009 | Nicolai | 362/547 |
| 8,147,109 | B2 * | 4/2012 | Wan et al. | 362/547 |
| 8,337,063 | B2 * | 12/2012 | Nagasawa et al. | 362/547 |
| 8,348,486 | B2 * | 1/2013 | Nakada | 362/538 |
| 2005/0094414 | A1 * | 5/2005 | Ishida et al. | 362/545 |
| 2010/0020563 | A1 * | 1/2010 | Ito et al. | 362/547 |
| 2010/0128463 | A1 * | 5/2010 | Kim et al. | 362/84 |
| 2010/0253223 | A1 * | 10/2010 | Inoue et al. | 315/82 |
| 2011/0254446 | A1 * | 10/2011 | Tominaga et al. | 315/82 |

FOREIGN PATENT DOCUMENTS

| | | |
|---|---|---|
| CN | 101614355 | 12/2009 |
| JP | 08-279308 | 10/1996 |
| JP | 2004-119198 | 4/2004 |
| JP | 2005-190825 | 7/2005 |
| JP | 2005-294234 | 10/2005 |
| JP | 2007-12368 | 1/2007 |

(Continued)

OTHER PUBLICATIONS

Office action dated Feb. 28, 2012 in corresponding Japanese Application No. 2010-082209.

(Continued)

*Primary Examiner* — Ismael Negron
(74) *Attorney, Agent, or Firm* — Harness, Dickey & Pierce, PLC

(57) ABSTRACT

A vehicle headlamp assembly including a housing case and a lens cover forming a light chamber, a projection lens, a shade and a light source are arranged within the light chamber in that order along an optical axis of the headlamp assembly. A radiating member includes plate-shaped radiating fins vertically placed in the light chamber, for radiating heat energy generated by the light source to surrounding air. A plate is arranged at a right angle to the radiating fins in the light chamber, for controlling air-convection flow around the radiating fins.

16 Claims, 17 Drawing Sheets

(56) References Cited

FOREIGN PATENT DOCUMENTS

| | | |
|---|---|---|
| JP | 2008-135260 | 6/2008 |
| JP | 2008-277237 | 11/2008 |
| JP | 4289268 | 4/2009 |
| JP | 2009-147175 | 7/2009 |
| JP | 2009-212019 | 9/2009 |

OTHER PUBLICATIONS

Office Action dated Oct. 25, 2013 in corresponding Chinese patent application No. 201110085107.7 with English translation thereof.

* cited by examiner

VEHICLE HEADLAMP ASSEMBLY WITH CONVECTION AIRFLOW CONTROLLING PLATE

CROSS-REFERENCE TO RELATED APPLICATION

This application is related to and claims priority from Japanese Patent Application No. 2010-82209 filed on Mar. 31, 2010, the contents of which are hereby incorporated by reference.

BACKGROUND OF THE INVENTION

1. Field of the Invention

The present invention relates to headlamp assemblies for motor vehicles, equipped with one or more radiating members capable of radiating heat energy generated by one or more light sources.

2. Description of the Related Art

There are various types of headlamp assemblies mounted to motor vehicles equipped with light emitting diodes. For example, Japanese patent No. JP4289268 has disclosed such a headlamp assembly comprised of a headlamp and a light emitting diode. In the headlamp assembly, a light projection lens, a shade and a light source are arranged in order, and a reflector is arranged so that it faces the light source. The reflector reflects the light generated by the light source to the forward direction. One or more radiating members are mounted to the light source in order to radiate the heat energy generated in the light source.

In the headlamp assembly, the light source is comprised of a first light source and a second light source. The first light source has a first light emission part which is vertically placed at an upper part observed from an optical axis of the light source. The second light source has a second light emission part which is vertically placed at a lower part observed from the optical axis of the light source. That is, the headlamp assembly generates two types of light beam patterns.

In general, a light emitting diode has an intrinsic drawback because of having a high heat density. For example, when the temperature of a light emitting diode increases, the light emitting efficiency is decreased, and its lifetime becomes short. Therefore, when light emitting diodes are closely arranged to each other and a small sized radiating member is used for decreasing the entire size of the headlamp assembly, the heat generation density becomes high and the heat radiating capability of the headlamp assembly is decreased.

In order to avoid the above conventional drawback, there is a conventional technique. For example, Japanese patent laid open publication No. JP 2005-190825 has disclosed such a conventional technique in which a headlamp assembly is equipped with an electric fan. The electric fan makes air flow from the rear side of a lamp chamber to the front side of the lamp chamber. Thus, the electric fan forcedly makes the heated air flow from the rear side of the lamp chamber to the front side of the light chamber in order to cool the inside of the light chamber.

Further, Japanese patent laid open publication No. JP 2009-147175 has disclosed a conventional technique in which a coolant flows in a printed circuit board on which one or more light emitting diodes in order to cool the light emitting diodes, and the coolant is supplied by a pump to the radiating plate through a cooling pipe in order to radiate heat energy from the radiating plate. This conventional technique increases the heat radiating capability.

However, the conventional techniques previously described require an electric fan in a lamp chamber and/or a pump and a cooling pipe in order to forcedly cool the light emitting diodes. This increases the entire size of the headlamp assembly, and electric power consumption because the conventional headlamp assemblies further needs to have additional electric power in order to drive the above electric fan and pump.

SUMMARY OF THE INVENTION

It is an object of the present invention to provide a headlamp assembly for vehicles with increased radiating capability without increasing the size and electric power consumption of the headlamp assembly.

To achieve the above purposes, the present invention provides a headlamp assembly for a motor vehicle. The headlamp assembly is comprised of a housing case, a lens cover, a light source, a reflector, a shade, a projection lens, a radiating member, and a control plate.

The lens cover is placed at a front part of the housing case which is open. The lens cover and the housing case form a light chamber. The light source is placed in the light chamber and generates and emits light. The reflector is placed in the light chamber and reflects the light emitted from the light source toward a front direction of the headlamp assembly. The reflector is placed at a rear position of the light source and partially surrounds the light source. The shade is placed in the light chamber and cuts off a part of the light reflected by the reflector. The projection lens is placed in the light chamber and projects the light reflected by the reflector toward the front direction of the headlamp assembly through the lens cover. The radiating member is vertically placed in the light chamber and comprised of a plurality of radiating fins for radiating heat energy generated by the light source. Each of the radiating fins has a plate shape. The control plate is placed in the light chamber and approximately crosses at a right angle to the radiating fins. The projection lens, the shade, and the light source are arranged in order from the front end of the headlamp assembly along the axial direction of the light source.

The control plate is placed around the outer periphery of the radiating fins. It is acceptable for the control plate to have a size which is capable of suppressing convection of ambient air around the radiating fins. Further, it is also acceptable for the control plate to be fixed to the housing case or the radiating fins. Still further, it is acceptable that the control plate and one of the shade, the reflector and the housing case are assembled in one body.

It is possible for the control plate to have penetration holes through which leading wires are wired. The leading wires connect the light source to a power source.

Further, it is also acceptable for clamp members to support the leading wires connected to the light source.

Still further, it is possible that a drive circuit is attached to the control plate, and the drive circuit controls the supply of electric power to the light source.

It is acceptable for the control plate to have a hollow box shape. The control device is placed in the control plate having the hollow box shape.

It is acceptable for the control plate to be fixed to one of the radiating member, the shade and the reflector. The rear part of the control plate has an arc shape. In this case, it is acceptable for the housing case to have an auxiliary control plate which is placed in parallel to the control plate. The auxiliary control plate is overlapped with the rear end of the control plate.

On the other hand, it is possible for the control plate to be movably supported by one or more springs. In this structure, the control plate is vibratory supported by using hinges. One or more weights are attached on a position of the control plate which is opposite to the hinges. Further, springs are attached onto the control plate in order to support the control plate so that the control plate approximately crosses at a right angle to the radiating fins.

Still further, it is acceptable for the control plate to be composed of thin spring plates. One end of the control plate is fixed and weights are attached onto the other end of the control plate.

Still further, it is possible to have a plurality of coil springs which is placed between the control plate and the housing case. The control plate approximately crosses at a right angle to the radiating fins.

Still further, it is possible that one end of a wire spring is attached to the control plate, and the other end of the wire spring is fixed to the housing case so that the control plate approximately crosses at a right angle to the radiating fins.

As previously described in detail, because the headlamp assembly according to the present invention has the control plate which approximately crosses at a right angle to the radiating fins, it is possible to enhance the capability of radiating the heat energy generated in the light source without increasing the size of the headlamp assembly and any electric power consumption.

Because the control plate has the size capable of suppressing the convection of ambient air around the outer periphery of the radiating fins, it is possible to generate convection of rising air (or warmed air) along the inside of the housing case and the lens cover. The structure of the headlamp assembly and this convection of the warmed air promote the heat exchange between the warmed air and the outer atmosphere, and thereby improve the radiating efficiency. Further, attaching and incorporating the drive circuit to the control plate makes it possible for the control plate to act as the radiating member.

On the other hand, because the control plate is movably supported by one or more coil springs, air flow can be generated by the vibration of the control plate when the motor vehicle drives. The air flow disturbs the temperature boundary layers. This improves the capability of radiating the heat energy generated by the light source. In this case, because the control plate has the shape which suppresses the convection of warmed ambient air around the radiating fins, it is possible to promote the heat exchange between the warmed air and the outside air. This further increases the radiating efficiency.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1:
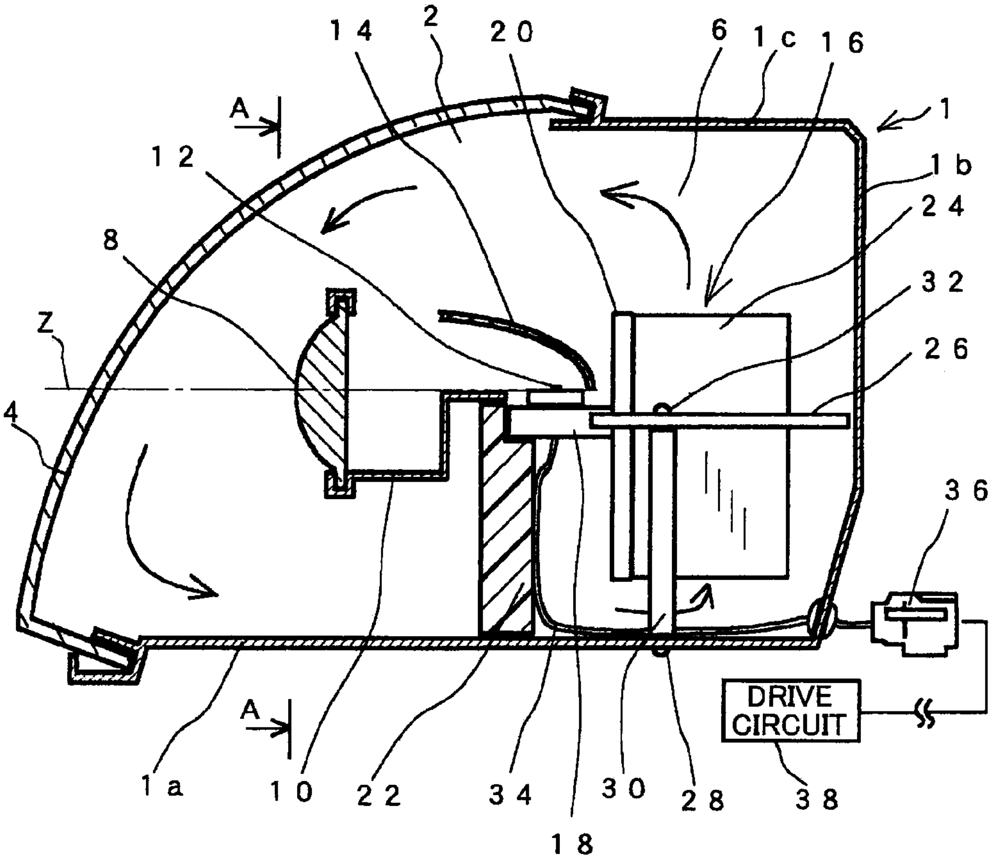
FIG. 1 is a schematic view showing a vertical cross section of a headlamp assembly mounted to a vehicle according to a first embodiment of the present invention.

Hereinafter, various embodiments of the present invention will be described with reference to the accompanying drawings. In the following description of the various embodiments, like reference characters or numerals designate like or equivalent component parts throughout the several diagrams.

First Embodiment

A description will now be given of the headlamp assembly according to the first embodiment of the present invention with reference to FIG. 1 to FIG. 3.

FIG. 1 is a schematic view showing a vertical cross section of the headlamp assembly (or a headlamp unit) which is mounted onto a vehicle (not shown) according to the first embodiment. FIG. 2 is a view showing a cross section of the headlamp assembly along the A-A line shown in FIG. 1. FIG. 3 is a schematic view showing a lateral cross section of the headlamp assembly according to the first embodiment shown in FIG. 1.

As shown in FIG. 1, the headlamp assembly according to the first embodiment is comprised of a housing case 1, a front lens cover 4 and other various types of components. A front part 2 of the housing case 1 is open. The front lens cover 4 is fitted and fixed to the front part 2 of the housing case 1 in order to approximately close the inside of the housing case 1. That is, the housing case 1 and the front lens cover 4 makes a light chamber 6. The light chamber 6 accommodates the various types of components In the light chamber 6, a projection lens 8, a shade 10 and a light source 12 are arranged in order along the optical axis Z when observed from the front side toward the rear side of the headlamp assembly. A reflector 14 faces the light source 12. The reflector 14 reflects the light emitted from the light source 12.

In the structure of the headlamp assembly according to the first embodiment, the projection lens 8 is composed of a plane concave lens. The projection lens 8 and the reflector 14 are arranged in the housing case 1 so that they have approximately the same focal point. The reflector 14 has an inner reflection surface having a curved surface such as a rotational parabolic surface. The shade 10 cuts off a part of the light reflected by the reflector 14. The remained part of the light reflected by the reflector 14 is irradiated by the projection lens 8 to the front of the headlamp assembly. In the structure of the headlamp assembly according to the first embodiment, the shade 10 further acts as a supporting member capable of supporting the projection lens 8.

The light source 12 is equipped with a light emitting diode (LED). The light source 12 is mounted and fixed to a horizontal plate 18 of a radiating member 16.

The horizontal plate 18 has a plane shaped plate and placed in a horizontal direction in the headlamp assembly. A vertical plate 20 of the radiating member 16 is placed at the rear side of the horizontal plate 18. The horizontal plate 18 and the vertical plate 20 are assembled together.

The vertical plate 20 is approximately perpendicular to the optical axis Z of the light source 12. The vertical plate 20 is vertically placed in the headlamp assembly according to the first embodiment.

The horizontal plate 18 is fixed approximately at the central part of the vertical plate 20.

The front end of the horizontal plate 18 is fixed to a supporting member 22 which is vertically placed and fixed to the bottom wall 1*a* of the housing case 1. The rear end of the shade 10 is fixed to the supporting member 22.

A gap is formed between the bottom side of the vertical plate 20 and the bottom wall 1*a* of the housing case 1. This gap allows the air to adequately flow and circulate in the headlamp assembly. Further, a gap between the upper side of the vertical plate 20 and the ceiling wall 1*c* of the housing case 1. This gap also allows the air to adequately flow and circulate in the headlamp assembly. The horizontal plate 18 and the vertical plate 20 are made of material with high heat conductivity, for example, aluminum.

A plurality of radiating fins 24 are arranged on the rear surface of the vertical plate 20. Each of the radiating fins 24 has a plate shape, and vertically fixed onto the rear surface of the vertical plate 20 toward the rear side of the housing case 1. That is, as shown in FIG. 1, each of the radiating fins 24 is extended from the rear surface of the vertical plate 20 toward the rear side of the vertical plate 20. The radiating fins 24 are arranged at a predetermined interval to each other in order to flow air through them. Each of the radiating fins 24 has the same length of the vertical plate 20 along the vertical direction. The rear end of each of the radiating fins 24 and a rear wall 1*b* of the housing case 1 makes a gap having a predetermined interval.

The radiating fins 24 are made of material with high heat conductivity such as aluminum.

The horizontal plate 18, the vertical plate 20 and the radiating fins 24 are made in one body by aluminum forging. It is also acceptable to fix the radiating fins 24 made of aluminum plate onto the rear surface of the vertical plate 20 by brazing as a metal-joining process.

Figure 3:
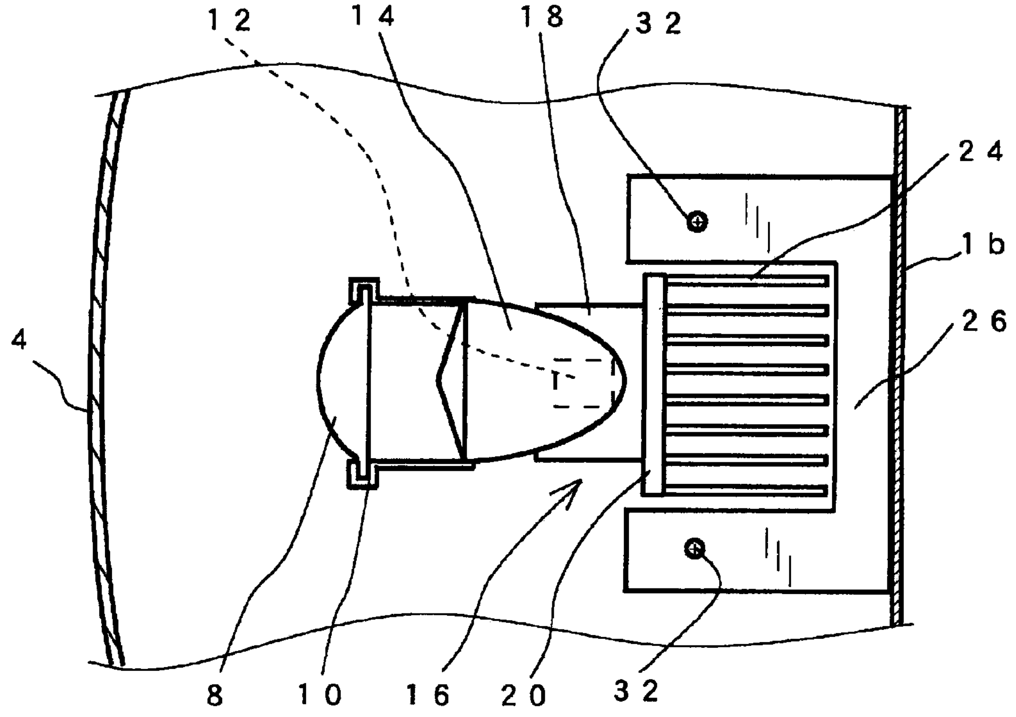
FIG. 3 is a schematic view showing a lateral cross section of the headlamp assembly according to the first embodiment of the present invention shown in FIG. 1.

A control plate 26 of a character "c" shape shown in FIG. 3 is placed approximately crossing to the radiating fins 24 so that the control plate 26 surrounds both the sides of the radiating fins 24 and the rear part of the radiating fins 24.

Figure 2:
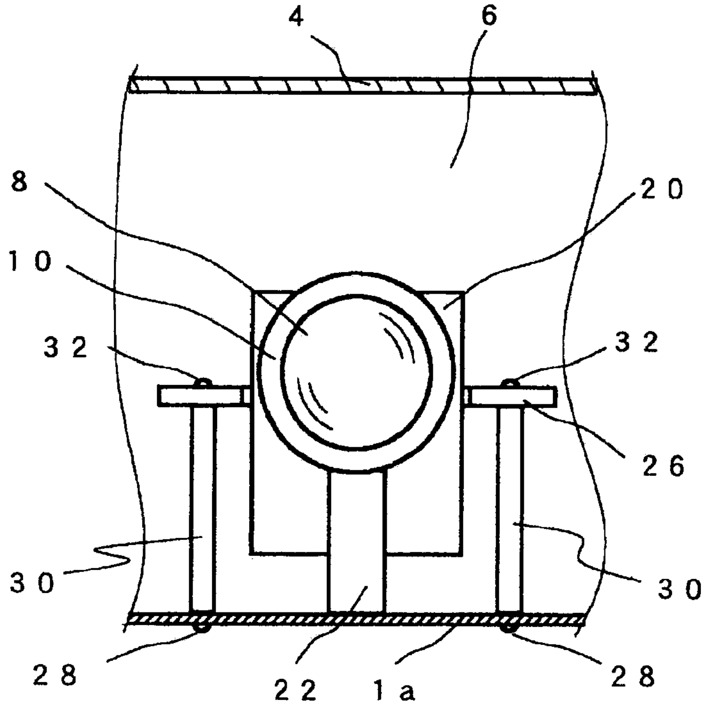
FIG. 2 is a view showing a cross section of the headlamp assembly along the A-A line shown in FIG. 1.

As shown in FIG. 2, a pair of poles 30 is fixed on the bottom wall 1*a* of the housing case 1 by screws 28 so that the poles 30 stand on the bottom wall 1*a* of the housing case 1. A front end of each of the poles 30 is fixed onto the control plate 26 by screws 32.

The control plate 26 and the horizontal plate 18 are placed approximately at the same height measured from the bottom surface 1*a* of the housing case 1. However, the concept of the present invention is not limited by this structure. For example, it is possible for the control plate 26 to place at a height measured from the bottom wall 1*a* of the housing case 1 within the vertical height of each of the radiating fins 24.

As shown in FIG. 3, the control plate 26 and the radiating fins 24 are arranged so as to prevent a large gap from being formed between them. That is, the control plate 26 and the radiating fins 24 are close to each other within a predetermined gap. It is also acceptable that the control plate 26 and the two radiating fins, which are positioned at both sides in the group composed of the radiating fins 24 (hereinafter, referring to the radiating-fin group), contact each other.

The control plate 26 is placed at both sides of the radiating-fin group in order to prevent the vertical convection of air in both sides of the radiating-fin group. As clearly shown in FIG. 3, the front end of the control plate 26 is placed in front of the front end of the vertical plate 20.

A unit composed of the projection lens 8, the shade 10, the light source 12, and the radiating member 16 is placed in the light chamber 6, it is arranged for the control plate 26 to reach both the side walls (not shown) of the housing case 1.

On the other hand, when a plurality of units, each being composed of the projection lens 8, the shade 10, the light source 12 and the radiating member 16, is placed in the light chamber 6, it is arranged that the control plates 26 are close to each other without forming any gap between them.

The control plate 26 and the radiating fins 24 are arranged so that the control plate 26 and the rear end of each of the radiating fins 24 are close to each other without forming a large gap. It is also possible for the control plate 26 and the rear end of each of the radiating fins 24 to contact each other.

The control plate 26 and the radiating fins 24 are arranged so that the control plate 26 is extended backward to the rear wall 1*b* of the housing case 1 and reaches the rear end of each of the radiating fins 24. This structure prevents the air from being vertically circulated between the rear end of the radiating fins 24 and the rear wall 1*b* of the housing case 1.

On the other hand, as shown in FIG. 1, leading wires 34 connected to the light source 12 are extended to the outside of the housing case 1 through the rear wall 1*b* of the housing case 1, and electrically connected to a drive circuit 38 through a connector 36.

The drive circuit 36 is a known circuit to supply electric power to the light source 12.

A description will now be given of the actions of the headlamp assembly according to the first embodiment of the present invention.

When the motor vehicle starts to drive and the light source is then turned on, the light emitted from the light source 12 is reflected by the reflector 14.

The shade 10 cuts off a part of the light reflected by the reflector 14, and the projection lens 8 irradiates the remained part (or non-cut off part) of the light toward the forward direction.

The heat energy generated by the light source 12 is conducted to the vertical plate 20 through the horizontal plate 18, and finally conducted to the radiating fins 24 through the vertical plate 20. The radiation from the radiating fins 24 warms the ambient air of the radiating fins 24, and the air is thereby expanded.

The expanded ambient air rises between the adjacent radiating fins 24 toward the ceiling wall 1*c* of the housing case 1. The air between the adjacent radiating fins 24 in a plurality of the radiating fins 24 is continuously warmed and rises. The control plate 26 suppresses the rising air (or warmed air) from falling toward the bottom surface 1*a* side along both the sides of the radiating fins 24, and further prevents the rising air from falling toward the bottom surface 1*a* side along the rear wall 1*b* of the housing case 1.

As shown by the arrow in FIG. 1, the rising air flows toward the front lens cover 4 along the ceiling wall 1*c* of the housing case 1. In this case, the reflector 14, the shade 10 and the horizontal plate 18 prevent the rising air from falling along the front surface of the vertical plate 20.

The heat exchange is executed between the air in the light chamber 6 and the outside ambient air of the headlamp assembly through the rear wall 1*b*, the ceiling wall 1*c*, the side wall and the front lens cover 4. The heat exchange cools the air in the light chamber 6.

Further, the air then falls along the front lens cover 4, and then flows from the bottom side of the front lens cover 4 along the bottom wall 1*a* of the housing case 1, and then passes through the gap between the bottom surface of the shade 10 and the bottom wall 1*a* of the housing case 1. During the above air flow, the heat exchange is executed between the bottom wall 1*a* of the housing case 1 and the outside atmosphere of the headlamp assembly.

The control plate 26 suppresses the warmed air from rising through the gap between both side surfaces of the radiating fins 24 and the side walls of the housing case 1, and further suppress the warmed air from rising through the gap between the rear side of the radiating fins 24 and the rear wall 1*b* of the housing case 1.

The warmed air rises through the gap between the adjacent radiating fins 24 and the heat energy from the radiating fins 24 continuously warms the air. The warmed air then rises toward the ceiling wall 1*c* of the housing case 1.

The warmed air passed through the adjacent radiating fins 24 reaches the ceiling wall 1*c* of the housing case 1 and flows along the inner side of the front lens cover 4. The cooled air after the heat exchange flows along the bottom wall 1*a* of the housing case 1, and is then supplied to the gap between the adjacent radiating fins 24. Thus, the air circulation is executed in the housing case 1.

In particular, because the outside air directly blows the outside surface of the front lens cover 4 when the motor vehicle is running, the heat exchange between the warmed air in the inside of the light chamber 6 and the outside air, the circulation path of convention of the inside air is made at the inside of the front lens cover 4, the heat exchange is promoted and the warmed air is thereby cooled.

The control plate 26 makes the convection flowing along the ceiling wall 1*c* of the housing case 1, the inner space of the front lens cover 4, and the bottom wall 1*a* of the housing case 1. This convection of the warmed air promotes the heat exchange between the warmed air and the outside air of the headlamp assembly, and suppresses the temperature of the air in the lamp chamber 6 from increasing. It is thereby possible to suppress the temperature of the light source 12 and the radiating member 16 from increasing. As a result, the structure of the headlamp assembly according to the first embodiment makes it possible to increase the radiating capability without increasing the entire size and the power consumption of the headlamp assembly.

Still further, when the vehicle drives on a road in cold weather, snow and ice are often attached on the front lens cover 4 of the headlamp assembly. Because the inside air in the space formed by the front lens cover 4 and the housing case 1 is warmed by the heat energy generated by the light source 12, the snow and ice attached on the outside surface of the head cover 4 are heated and then solved. This maintains the radiation of the light from the headlamp assembly toward the front of the running vehicle.

Second Embodiment

A description will be given of the headlamp assembly according to the second embodiment of the present invention with reference to FIG. 4 and FIG. 5.

Figure 4:
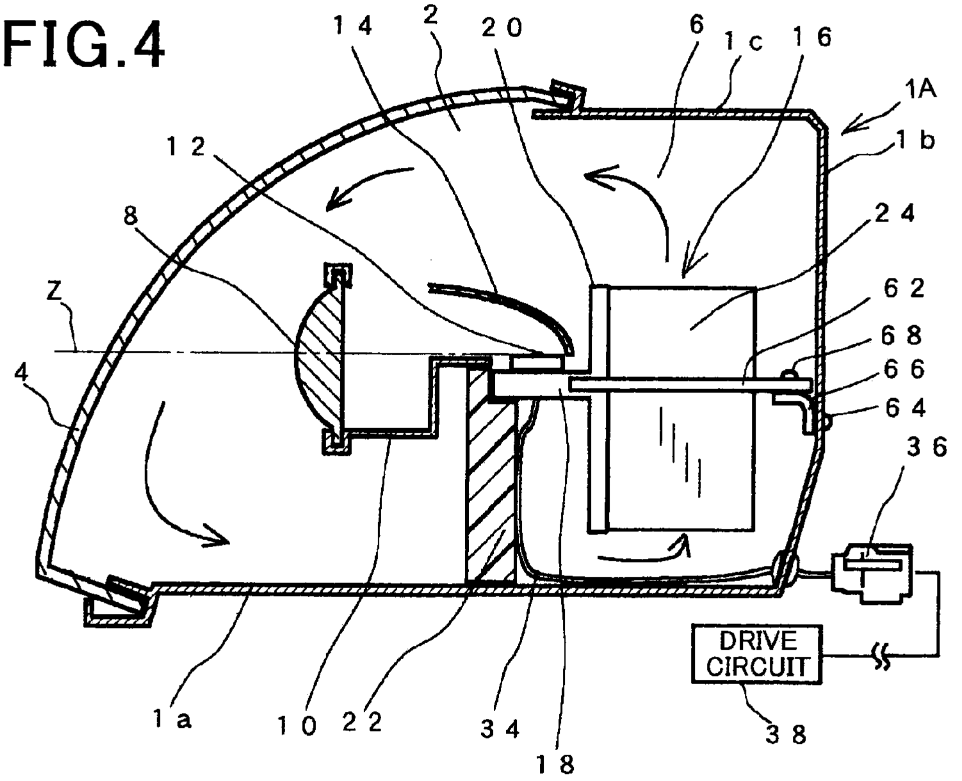
FIG. 4 is a schematic view showing a vertical cross section of a headlamp assembly mounted to a vehicle according to a second embodiment of the present invention.
Figure 5:
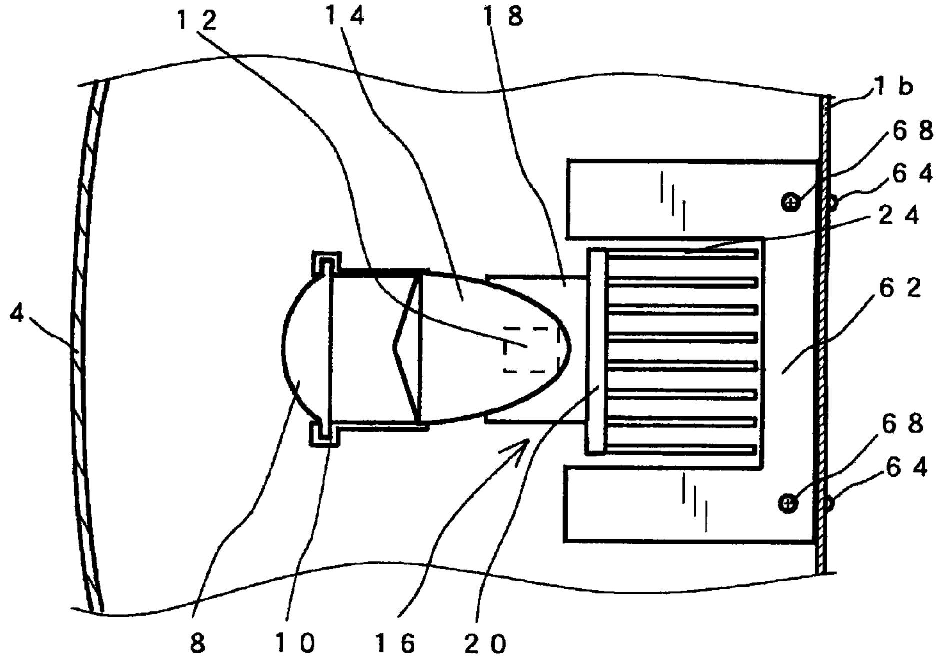
FIG. 5 is a schematic view showing a lateral cross section of the headlamp assembly according to the second embodiment of the present invention shown in FIG. 4.

FIG. 4 is a schematic view showing a vertical cross section of the headlamp assembly mounted to a vehicle according to the second embodiment of the present invention. FIG. 5 is a schematic view showing a lateral cross section of the headlamp assembly according to the second embodiment shown in FIG. 4.

The same components of the headlamp assemblies according to the first and second embodiments shown in FIG. 1 to FIG. 5 will be referred with the same reference numbers and the explanation of them is omitted for brevity.

The headlamp assembly according to the second embodiment has a control plate 62. The control plate 62 shown in FIG. 4 has the same shape of the control plate 26 of the first embodiment shown in FIG. 1. In the headlamp assembly according to the second embodiment, L-type brackets are fixed to the rear wall 1*b* of the housing case 1A by screws 64. The control plate 62 is fixed to the L-type brackets 66 by screws. That is, as shown in FIG. 5, the control plate 62 is supported by the L-type brackets 66 and surrounds the radiating fins 24 while the control plate 62 crosses approximately at a right angle to the radiating fins 24.

Similar to the headlamp assembly according to the first embodiment previously described, the structure of the headlamp assembly according to the second embodiment also makes it possible to suppress the warmed air from falling along both the surfaces of the radiating fins 24 and the rear side of each of the radiating fins 24, and to make the convection flow of the warmed air along the circulation flow composed of the ceiling wall 1*c* of the housing case 1A, the inside of the front lens cover 4, and the bottom wall 1*a* of the housing case 1A. The structure of the headlamp assembly according to the second embodiment can improve the radiating capability of the heat energy generated by the light source 12.

Third Embodiment

A description will be given of the headlamp assembly according to the third embodiment of the present invention with reference to FIG. 6, FIG. 7 and FIG. 8.

Figure 6:
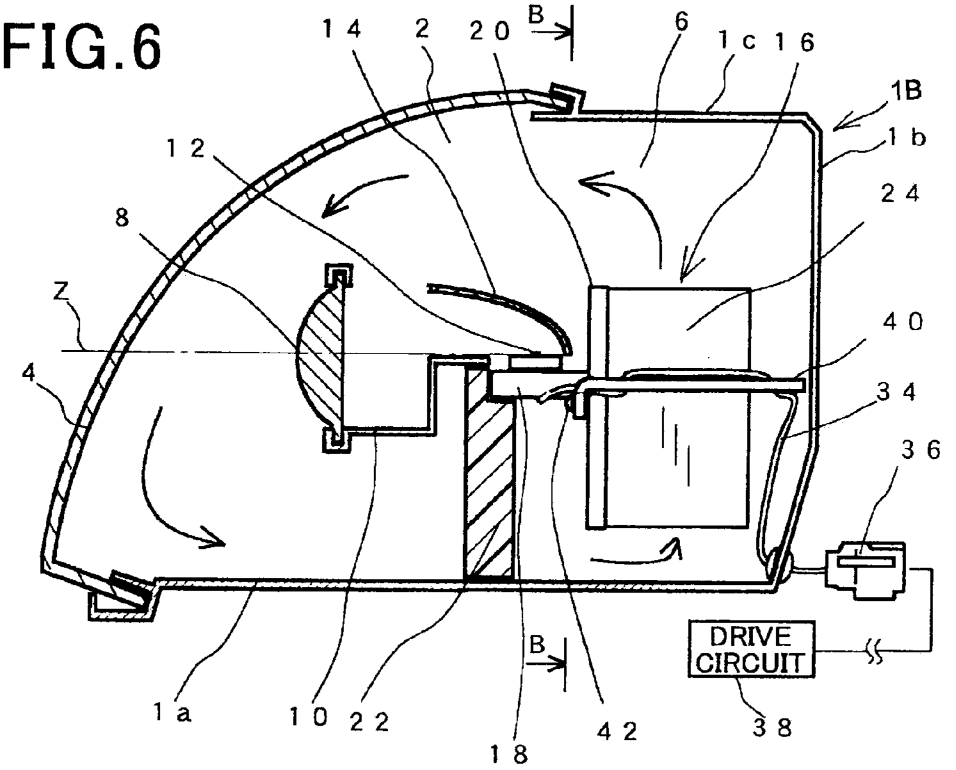
FIG. 6 is a schematic view showing a vertical cross section of a headlamp assembly mounted to a vehicle according to a third embodiment of the present invention.

FIG. 6 is a schematic view showing a vertical cross section of a headlamp assembly mounted to a vehicle according to the third embodiment of the present invention. FIG. 7 is a view showing a cross section of the headlamp assembly along the B-B line shown in FIG. 6. FIG. 8 is a schematic view showing a lateral cross section of the headlamp assembly according to the third embodiment shown in FIG. 7.

The headlamp assembly according to the third embodiment has a control plate 40. In contrast with the shape of the control plate 20 shown in FIG. 1, the front part of the control plate 40 is bended toward the bottom wall 1*a* of the housing case 1B and extended at the front side of the vertical plate 20 shown in FIG. 6.

The control plate 40 in the headlamp assembly according to the third embodiment is fixed to the vertical plate 20 by screws 42. The method of fixing the control plate 40 is different from the method of fixing the control plate 26 to the bottom wall 1*a* of the housing case 1 by using the poles 30 and the screws 28 in the headlamp assembly according to the first embodiment previously described.

Figure 7:
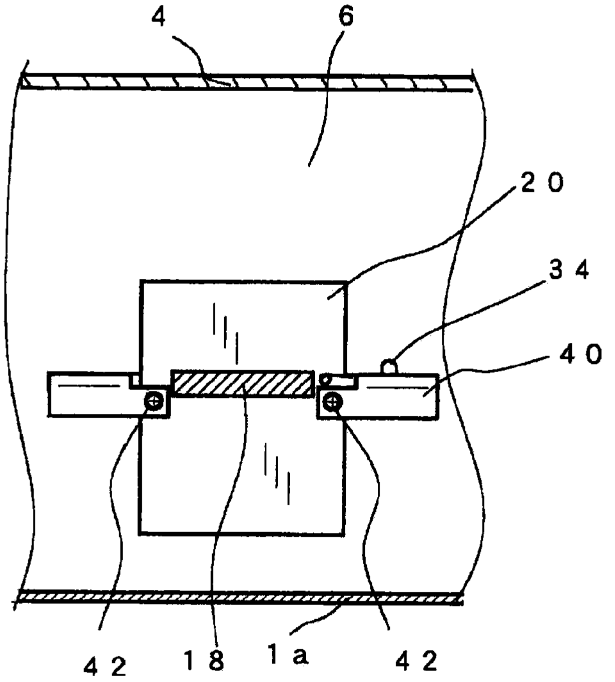
FIG. 7 is a view showing a cross section of the headlamp assembly along the B-B line shown in FIG. 6.
Figure 8:
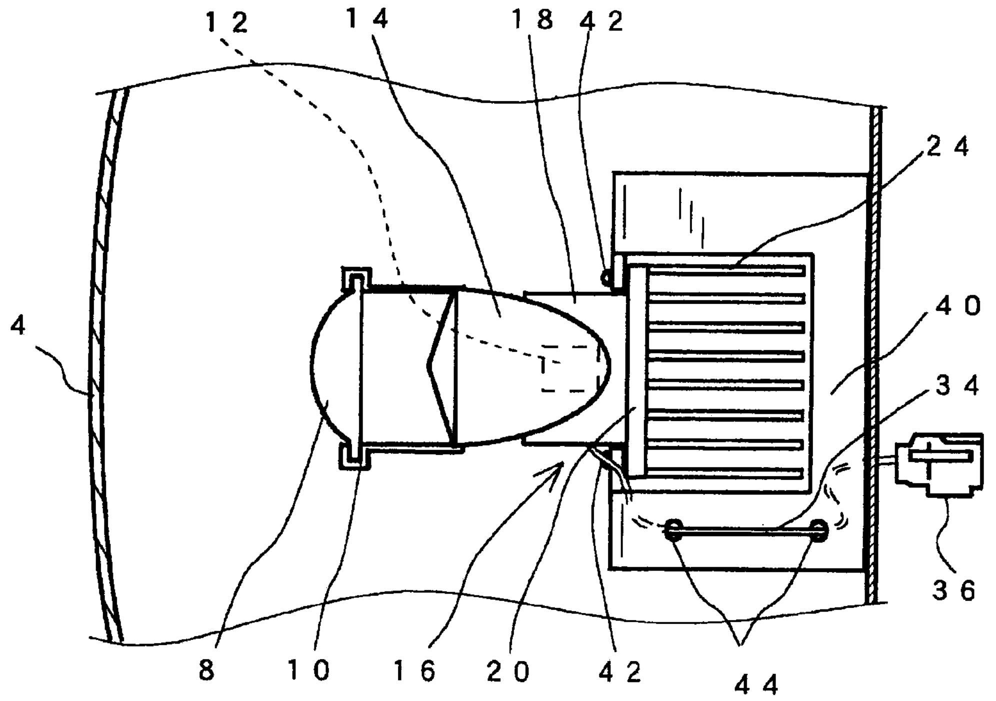
FIG. 8 is a schematic view showing a lateral cross section of the headlamp assembly according to the third embodiment of the present invention shown in FIG. 7.

The other components of the headlamp assemblies according to the third embodiment shown in FIG. 6, FIG. 7 and FIG. 8 are the same components in the headlamp assembly according to the first embodiment, and the explanation of these same components is omitted here for brevity.

Similar to the structure of the headlamp assembly according to the first embodiment previously described, the control plate 40 in the headlamp assembly according to the third embodiment also makes it possible to suppress the warmed air from falling along both the surfaces of the radiating fins 24 and the rear side of each of the radiating fins 24, and to make the convection flow of the warmed air along the ceiling wall 1*c* of the housing case 1B, the inside of the front lens cover 4, and the bottom wall 1*a* of the housing case 1B. The structure of the headlamp assembly according to the third embodiment can improve the radiating capability of the heat energy generated by the light source 12.

Still further, the presence of the control plate 40 makes it possible to eliminate the poles 30 from the structure of the headlamp assembly according to the first embodiment, and to thereby provide a simple configuration of the headlamp assembly and decrease the total weight of the headlamp assembly. In particular, the structure of the headlamp assembly according to the third embodiment makes it possible to avoid the drawback in which the presence of the poles 30 prevents the air from smoothly flowing.

As shown in FIG. 8, a pair of through holes 44 is formed in the control plate 40 in the headlamp assembly according to the third embodiment. The through holes 44 are arranged along the longitudinal direction of the headlamp assembly, namely along the direction of the optical axis of the light emitted from the light source 12. The pair of the leading wires 34 is placed through the pair of the through holes 44. This makes it possible to increase the rigidity of the control plate 40. Similar to the leading wires 34 in the headlamp assembly according to the first embodiment shown in FIG. 1, it is also acceptable to place the pair of the leading wires 34 according to the third embodiment along the bottom wall 1*a* of the housing case 1 instead of the arrangement of the leading wires shown in FIG. 8.

Fourth Embodiment

A description will be given of the headlamp assembly according to the fourth embodiment of the present invention with reference to FIG. 9 and FIG. 10.

Figure 9:
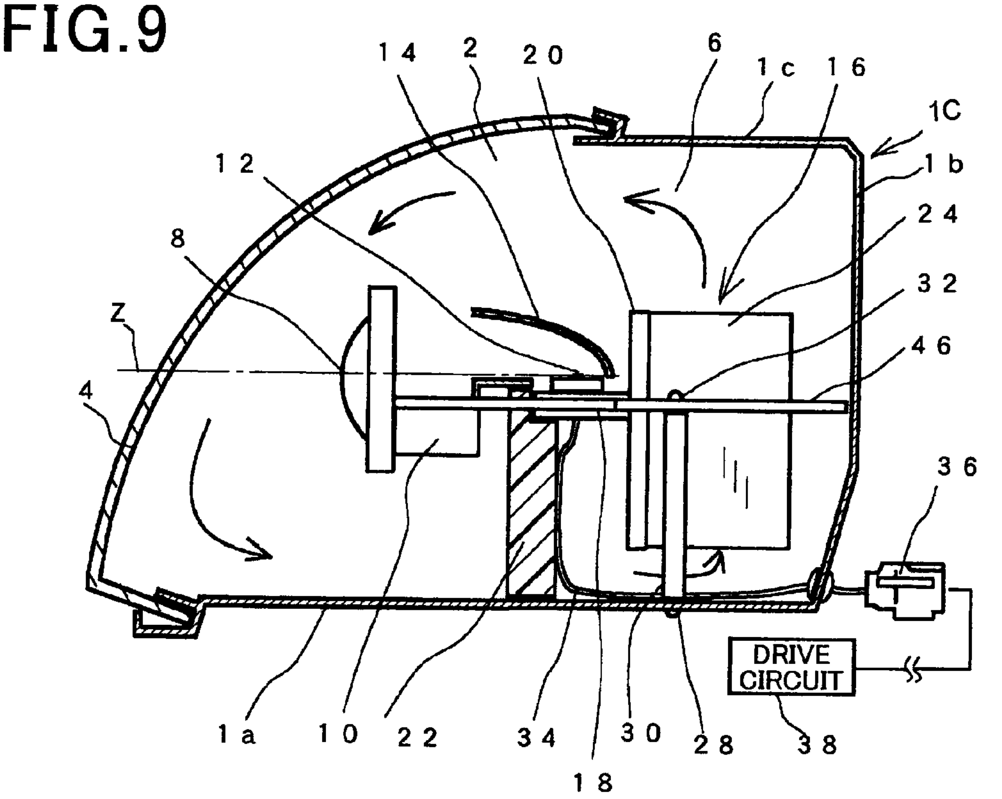
FIG. 9 is a schematic view showing a vertical cross section of a headlamp assembly mounted to a vehicle according to a fourth embodiment of the present invention.

FIG. 9 is a schematic view showing a vertical cross section of the headlamp assembly mounted to a vehicle according to the fourth embodiment of the present invention. FIG. 10 is a schematic view showing a lateral cross section of the headlamp assembly according to the fourth embodiment shown in FIG. 9.

Figure 10:
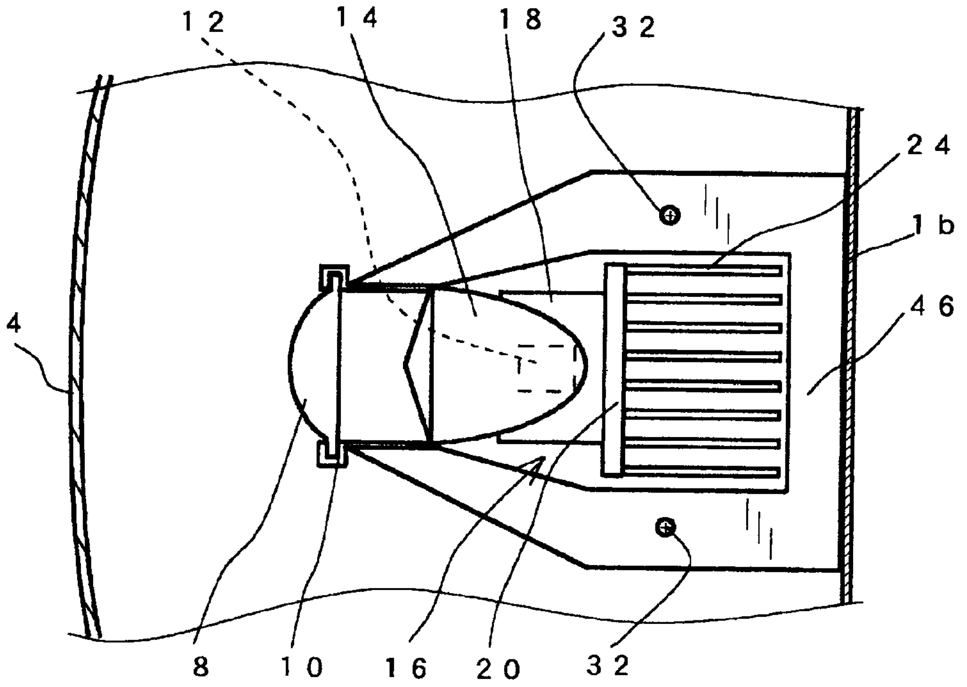
FIG. 10 is a schematic view showing a lateral cross section of the headlamp assembly according to the fourth embodiment of the present invention shown in FIG. 9.

In contrast to the structure of the control plate 26 in the headlamp assembly according to the first embodiment, the headlamp assembly according to the fourth embodiment has an assembly of the control plate 46 and the shade 10 shown in FIG. 9 and FIG. 10. That is, the control plate 46 and the shade 10 are assembled in one body. The control plate 46 extends from the shade 10 to the rear wall 1*b* of the housing case 1C while accommodating the light source 12. Using the assembly of the control plate 46 and the shade 10 makes it possible to easily assemble the components of the headlamp assembly according to the fourth embodiment.

The control plate 46 is fixed to and supported by the bottom wall 1*a* of the housing case 1C by the poles 30. However, the concept of the present invention is not limited by this structure. Similar to the structure of the second embodiment shown in FIG. 4 and FIG. 5, it is possible for the vertical plate 20 to support the control plate 46.

Similar to the effects of the headlamp assembly according to the first embodiment previously described, the control plate 46 in the headlamp assembly according to the fourth embodiment also makes it possible to suppress the warmed air from falling along both the surfaces of the radiating fins 24 and the rear side of each of the radiating fins 24, and to make the convection flow of the warmed air along the ceiling wall 1*c* of the housing case 1C, the inside of the front lens cover 4, and the bottom wall 1*a* of the housing case 1C. The structure of the headlamp assembly according to the fourth embodiment can improve the radiating capability of the heat energy generated by the light source 12.

Fifth Embodiment

A description will be given of the headlamp assembly according to the fifth embodiment of the present invention with reference to FIG. 11 and FIG. 12.

Figure 11:
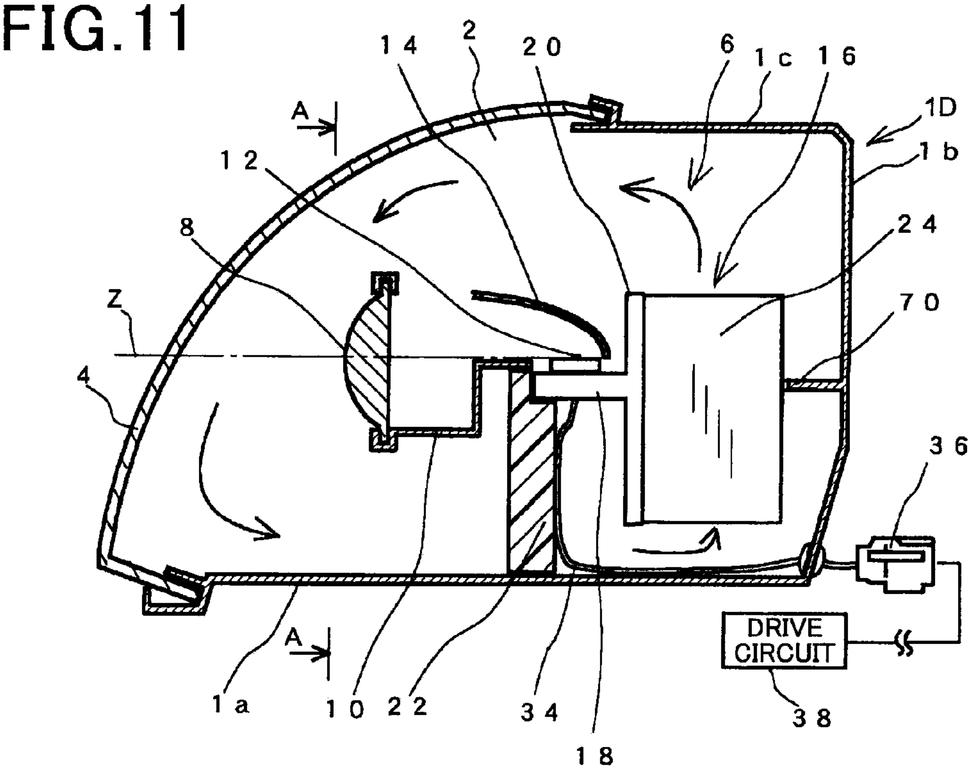
FIG. 11 is a schematic view showing a vertical cross section of a headlamp assembly mounted to a vehicle according to a fifth embodiment of the present invention.

FIG. 11 is a schematic view showing a vertical cross section of the headlamp assembly mounted to a vehicle according to the fifth embodiment of the present invention. FIG. 12 is a schematic view showing a lateral cross section of the headlamp assembly according to the fifth embodiment shown in FIG. 11.

Figure 12:
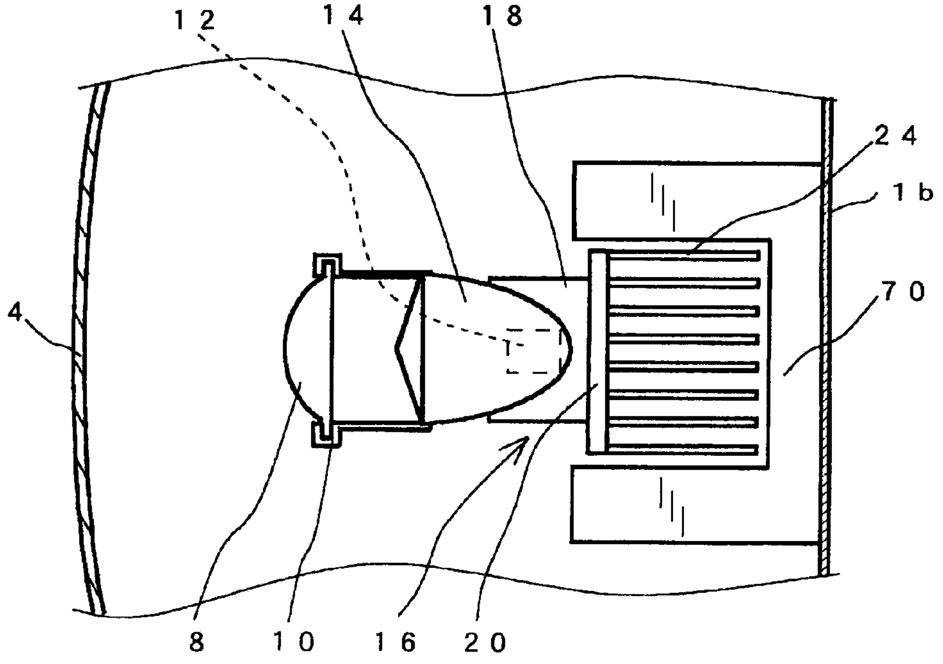
FIG. 12 is a schematic view showing a lateral cross section of the headlamp assembly according to the fifth embodiment of the present invention shown in FIG. 11.

As shown in FIG. 11 and FIG. 12, the control plate 70 in the headlamp assembly according to the fifth embodiment approximately has the same shape of the control plate 26 according to the first embodiment shown in FIG. 1 to FIG. 3. A different of the control plate 70 from the control plate 26 is that the control plate 70 and the rear wall 1*b* of the housing case 1D are assembled in one body and this one body extends toward the front side of the headlamp assembly. This structure of the control plate 70 and the rear wall 1*b* makes it possible to provide an easy assembling and decrease the assembling work of the components when the headlamp assembly is manufactured. Further, because there is no gap between the control plate 70 and the rear wall 1*b* of the housing case 1D, it is possible to certainly make the convection of the warmed air in the inside of the front lens cover 4 of the headlamp assembly.

Similar to the effects of the headlamp assembly according to the first embodiment previously described, the control plate 70 in the headlamp assembly according to the fifth embodiment also makes it possible to suppress the warmed air from falling along both the surfaces of the radiating fins 24 and the rear side of each of the radiating fins 24, and to make the convection flow of the warmed air along the ceiling wall 1*c* of the housing case 1D, the inside of the front lens cover 4, and the bottom wall 1*a* of the housing case 1D. The structure of the headlamp assembly according to the fifth embodiment can improve the radiating capability of the heat energy generated by the light source 12.

Sixth Embodiment

A description will be given of the headlamp assembly according to the sixth embodiment of the present invention with reference to FIG. 13 and FIG. 14.

Figure 13:
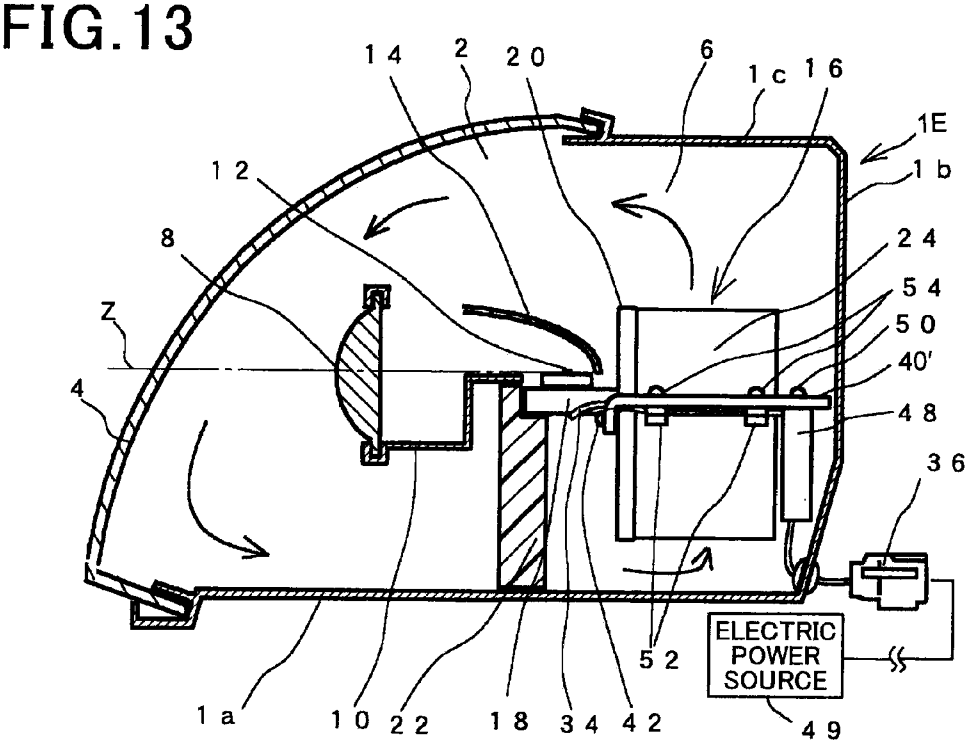
FIG. 13 is a schematic view showing a vertical cross section of a headlamp assembly mounted to a vehicle according to a sixth embodiment of the present invention.
Figure 14:
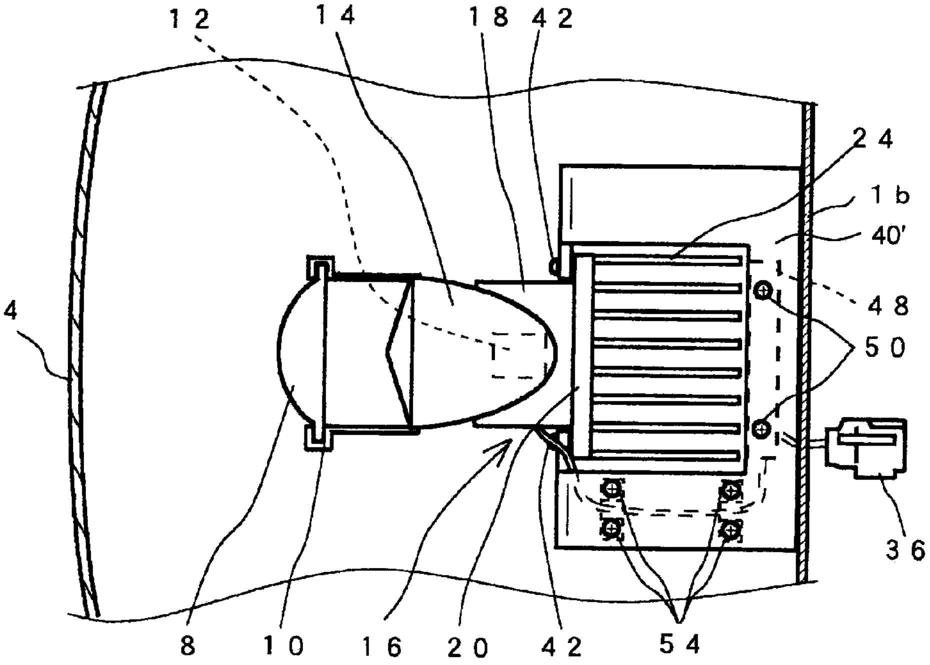
FIG. 14 is a schematic view showing a lateral cross section of the headlamp assembly according to the sixth embodiment of the present invention shown in FIG. 13.

FIG. 13 is a schematic view showing a vertical cross section of the headlamp assembly mounted to a vehicle according to the sixth embodiment of the present invention. FIG. 14 is a schematic view showing a lateral cross section of the headlamp assembly according to the sixth embodiment shown in FIG. 13.

Similar to the structure of the control plate 40 according to the third embodiment, the control plate 40' is fixed to the vertical plate 20 by screws. Further, in the headlamp assembly according to the sixth embodiment, a circuit box 48 equipped with the drive circuit is fixed to the back surface at the rear side of the control plate 40. The circuit box 48 is placed between the rear side of the radiating fins 24 and the rear wall 1*b* of the housing case 1E. As shown in FIG. 13 and FIG. 14, the drive circuit placed in the circuit box 48 is electrically connected to the power source 49 through the connector 36.

The leading wires 34 are extended from the circuit box 48 to the light source 12. The leading wires 34 are wired along the back surface of the control plate 40' to the light source 12. The leading wires 34 are supported by a pair of clamp members 52. The clamp members 52 are fixed to the back surface of the control plate 40' by screws 54.

Fixing the circuit box 48 to the back surface at rear side of the control plate 46 makes it possible to separate the circuit box 48 from the light source 12 and to decrease the influence of heat energy generated by the light source 12 to the circuit box 48 because the back surface side of the control plate 40' has a low temperature rather than the front surface (at the light source 12 side) of the control plate 40'.

Because the drive circuit in the circuit box 48 itself generates heat energy, it is possible to radiate the heat energy of the drive circuit through the control plate 40'. Still further, fixing the circuit box 48 to the control plate 40' can increase the rigidity of the control plate 40'.

Seventh Embodiment

A description will be given of the headlamp assembly according to the seventh embodiment of the present invention with reference to FIG. 15.

Figure 15:
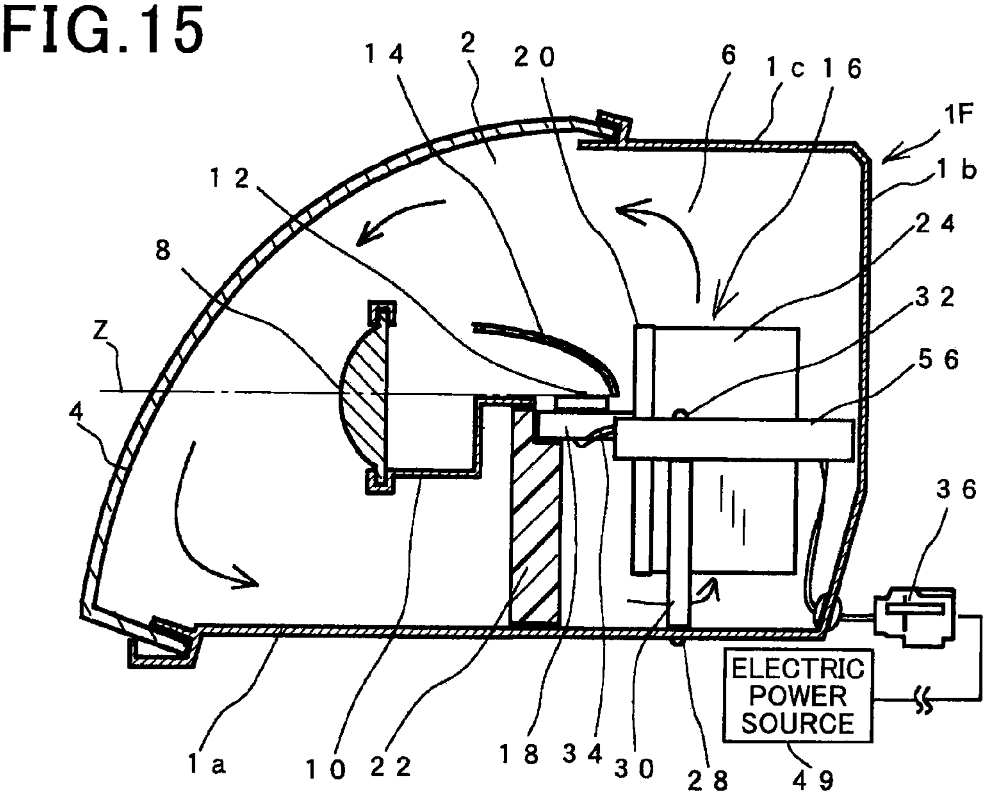
FIG. 15 is a schematic view showing a vertical cross section of a headlamp assembly mounted to a vehicle according to a seventh embodiment of the present invention.

FIG. 15 is a schematic view showing a vertical cross section of the headlamp assembly mounted to a vehicle according to the seventh embodiment of the present invention.

As shown in FIG. 15, a control plate 56 has a hollow box shape. In other words, the structure of the control plate 56 is a combination of the hollow box shape and the structure of the control plate 26 according to the first embodiment. In the control plate 56 according to the seventh embodiment, the control plate 56 of a hollow box shape accommodates the drive circuit. This structure of the control plate 56 having the hollow box shape acts as the radiating plate capable of radiating heat energy, and further increases the rigidity of the control plate 56 because it incorporates the drive circuit.

Similar to the effects of the headlamp assemblies according to the first and sixth embodiments previously described, the control plate 56 in the headlamp assembly according to the seventh embodiment also makes it possible to suppress the warmed air from falling along both the surfaces of the radiating fins 24 and the rear side of each of the radiating fins 24, and to make the convection flow of the warmed air along the ceiling wall 1*c* of the housing case 1F, the inside of the front lens cover 4, and the bottom wall 1*a* of the housing case 1F. The structure of the headlamp assembly according to the seventh embodiment can improve the radiating capability of the heat energy generated by the light source 12.

Eighth Embodiment

A description will be given of the headlamp assembly according to the eighth embodiment of the present invention with reference to FIG. 16.

Figure 16:
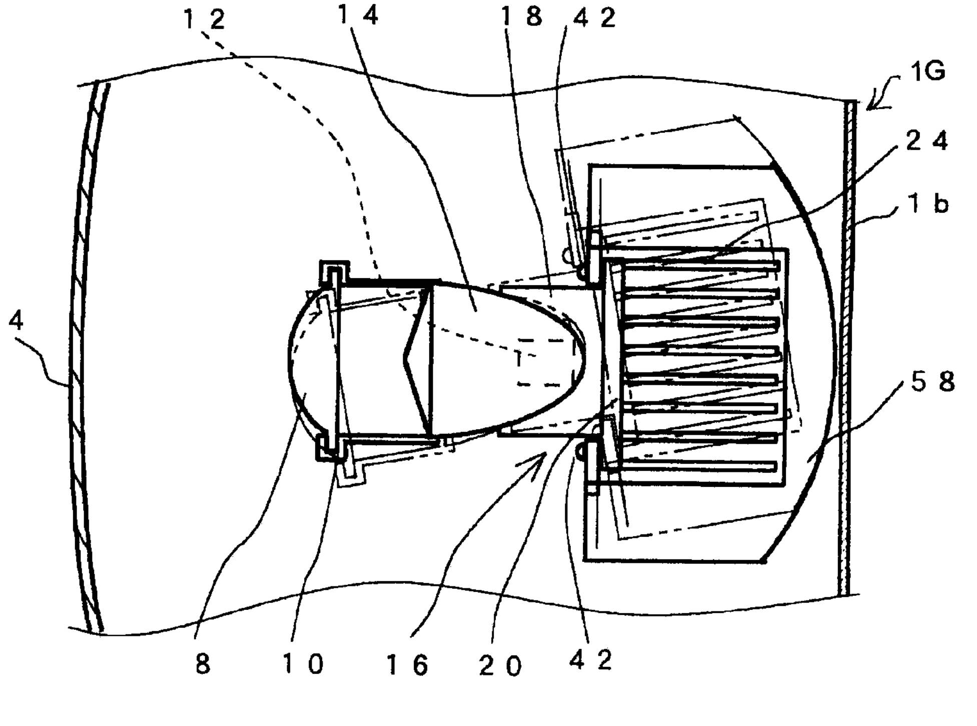
FIG. 16 is a schematic view showing a lateral cross section of a headlamp assembly according to an eighth embodiment of the present invention.

FIG. 16 is a schematic view showing a lateral cross section of the headlamp assembly according to the eighth embodiment.

Similar to the structure of the control plate 40 in the headlamp assembly according to the third embodiment shown in FIG. 6 to FIG. 8, a control plate 58 in the headlamp assembly according to the eighth embodiment is fixed to the vertical plate 20 by screws 42. The rear side of the control plate 58 has a convex arc shape toward the rear wall 1*b* of the housing case 1G. The structure of the control plate 58 makes it possible for the unit composed of the projection lens 8, the shade 10, the light source 12 and the radiating member 16 to make a swivel mechanism to rotate around an axis which crosses at a right angle to the optical axis Z of the light emitted from the light source 12. Even if the direction of the optical axis Z of the light is changed, this structure of the control plate 58 makes it possible to avoid the control plate 58 from interfering with the rear wall 1*b* of the housing 1G. It is acceptable to have the structure in which the control plate 58 is fixed to the reflector 14 or the control plate 58 and the reflector 14 are assembled in one body unless it is not fixed to the housing case 1G.

Ninth Embodiment

A description will be given of the headlamp assembly according to the ninth embodiment of the present invention with reference to FIG. 17 and FIG. 18.

Figure 17:
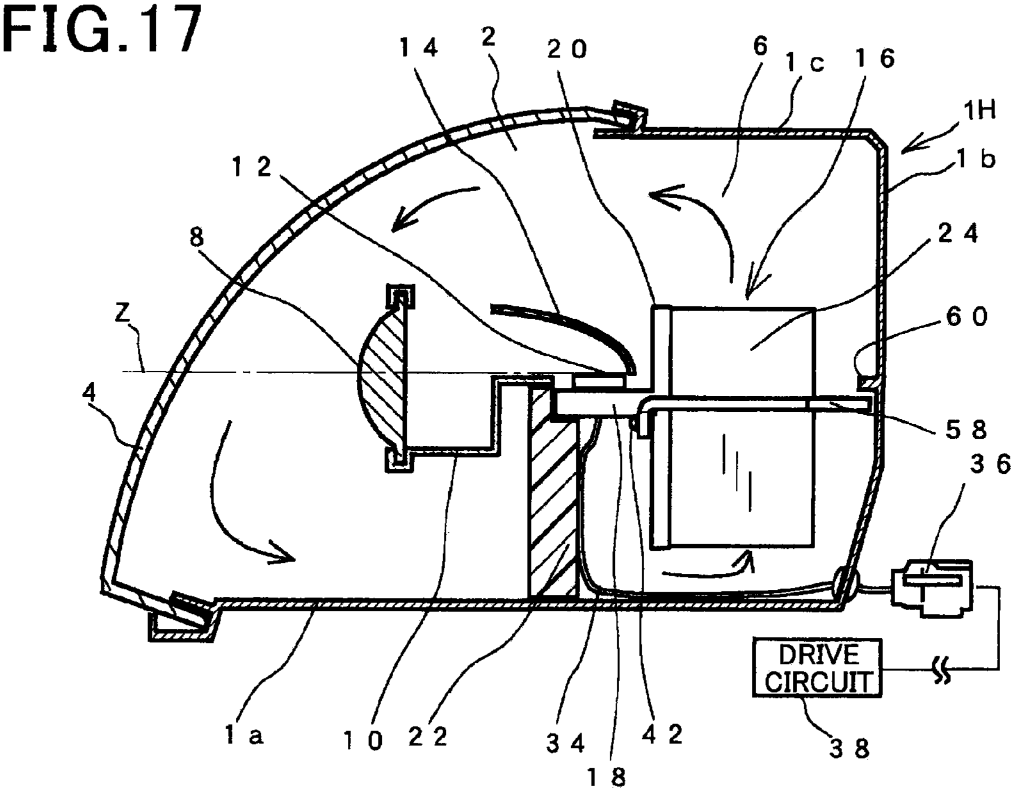
FIG. 17 is a schematic view showing a vertical cross section of a headlamp assembly mounted to a vehicle according to a ninth embodiment of the present invention.
Figure 18:
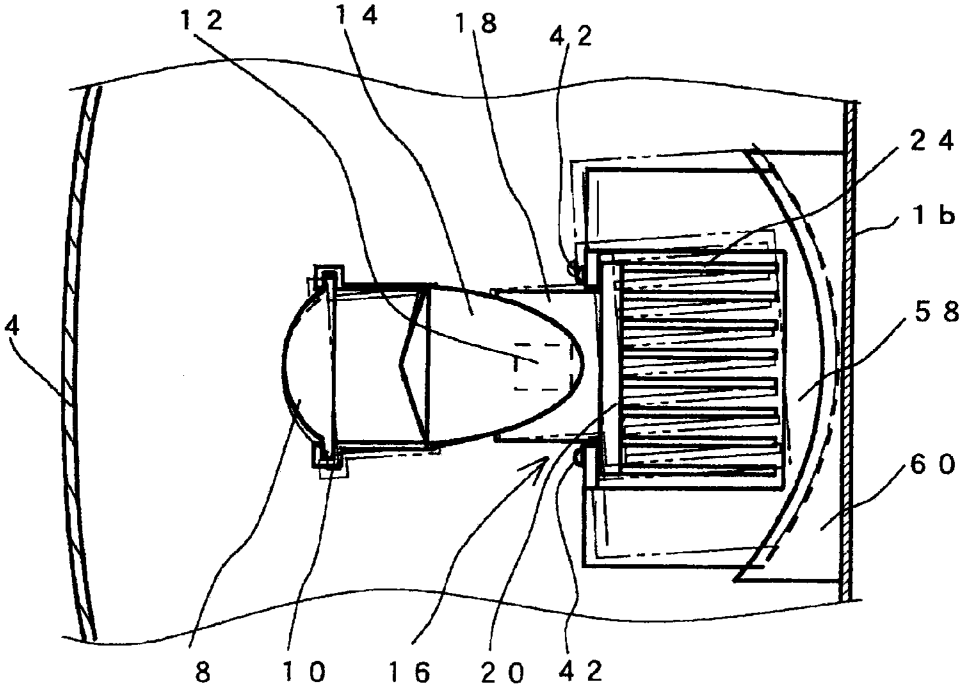
FIG. 18 is a schematic view showing a lateral cross section of the headlamp assembly according to the ninth embodiment of the present invention shown in FIG. 17.

FIG. 17 is a schematic view showing a vertical cross section of the headlamp assembly mounted to a vehicle according to the ninth embodiment of the present invention. FIG. 18 is a schematic view showing a lateral cross section of the headlamp assembly according to the ninth embodiment shown in FIG. 17.

The structure of the headlamp assembly according to the ninth embodiment is a combination of an auxiliary control plate 60 and the control plate 58 of the eighth embodiment. The auxiliary control plate 60 projects from the rear wall 1*b* of the housing case 1H toward the front side of the rear wall 1*b*. The auxiliary control plate 60 is placed in parallel to the control plate 58, and the auxiliary control plate 60 and the control plate 58 are vertically laminated.

The auxiliary control plate 60 and the housing 1H are assembled in one body. The front end of the auxiliary control plate 60 has a concave arc shape toward the front direction. The structure of the headlamp assembly according to the ninth embodiment has the auxiliary control plate 60 above or over the control plate 58. However, the concept of the present invention is not limited by the structure. For example, it is possible to form the auxiliary control plate 60 below the control plate 58.

Having the auxiliary control plate 60 makes it possible to certainly close the gap which is formed between the control plate 58 and the rear wall 1*b* of the housing case 1H. This structure makes it possible to prevent the convection of the warmed air from being generated between the radiating fins 24 and the rear wall 1*b* of the housing case 1H.

Similar to the headlamp assembly according to the first embodiment previously described, the structure of the headlamp assemblies according to the eighth and ninth embodiments also makes it possible to suppress the warmed air from falling along both the surfaces of the radiating fins 24 and the rear side of each of the radiating fins 24, and to make the convection of the warmed air flow in the circulation path composed of the ceiling wall 1*c* of the housing case 1H, the inside of the front lens cover 4, and the bottom wall 1*a* of the housing case 1H. The structure of the headlamp assemblies according to the eighth and ninth embodiments can improve the radiating capability of the heat energy generated by the light source 12.

Tenth Embodiment

A description will be given of the headlamp assembly according to the tenth embodiment of the present invention with reference to FIG. 19 and FIG. 20.

Figure 19:
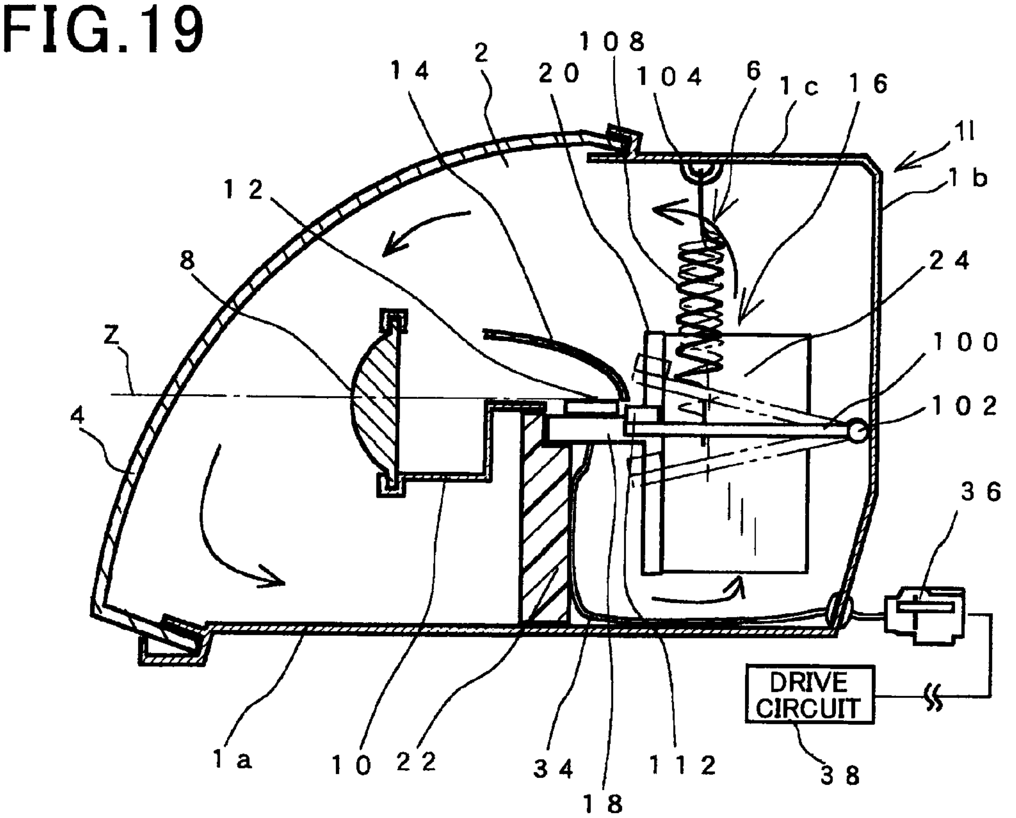
FIG. 19 is a schematic view showing a vertical cross section of a headlamp assembly mounted to a vehicle according to a tenth embodiment of the present invention.

FIG. 19 is a schematic view showing a vertical cross section of the headlamp assembly mounted to a vehicle according to the tenth embodiment of the present invention. FIG. 20 is a schematic view showing a lateral cross section of the headlamp assembly according to the tenth embodiment shown in FIG. 19.

A control plate 100 according to the tenth embodiment has the same shape of the control plate 26 according to the first embodiment.

The rear end of the control plate 100 is movably supported by the rear wall 1*b* of the housing case 1I through hinges 102. Each of the hinges 102 movably supports the control plate 100 around the axis which crosses approximately at a right angle to each of the radiating fins 24 as shown in FIG. 19.

Hooks 104 are formed on the ceiling wall 1*c* of the housing case 1I. Each of the hooks 104 hangs a spring coil 108. Penetration holes 110 are formed in the control plate 100. That is, the spring coil 108 is hanging between the corresponding hook 104 and the corresponding penetration hole 110 formed in the control plate 100.

Figure 20:
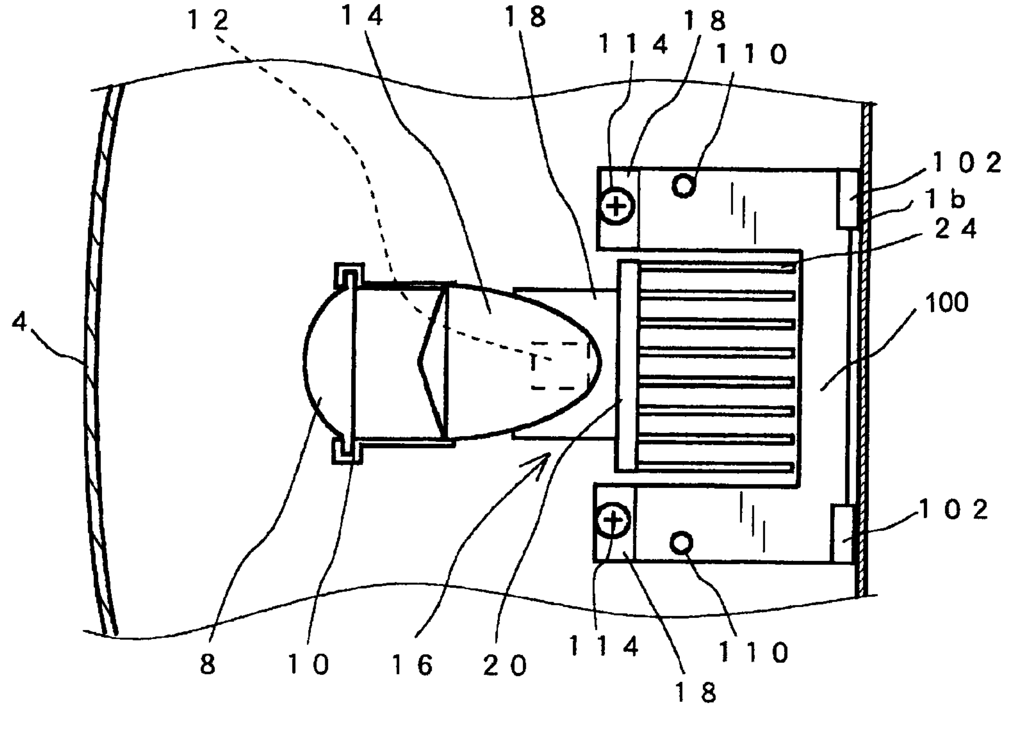
FIG. 20 is a schematic view showing a lateral cross section of the headlamp assembly according to the tenth embodiment of the present invention shown in FIG. 19.

As shown in FIG. 19 and FIG. 20, at both sides of the radiating fins 24, the hooks 104 and the coil springs 108 are placed and the penetration holes 110 are formed in the control plate 100.

A pair of weights 112 is fixed to the front end of the control plate 100 by screws 114. The front end of the control plate 100 is opposite to the position of the hinges 102.

The urging force of the coil springs 108 is balanced with the weight of the control plate 100 and the two weights 112. The control plate 100 is horizontally placed and crosses approximately at a right angle to the radiating fins 24. The urging force of the coil springs 108 and the weight of the control plate 100 and the two weights 112 are adjusted so that the control plate 26 is vertically vibrated around the axis of the hinges 102 when the motor vehicle drives.

Next, a description will now be given of the actions of the headlamp assembly having the above structure according to the tenth embodiment.

When the motor vehicle equipped with the headlamp assemblies according to the tenth embodiment starts to drive, and the driver turns on the light source 12, the light emitted from the light source 12 is reflected by the reflector 14.

The shade 10 cuts off a part of the light reflected by the reflector 14. The remained part of the light reflected by the reflector 14 is irradiated by the projection lens 8 to the front of the headlamp assembly.

The heat energy generated by the light source 12 is conducted to the vertical plate 20 through the horizontal plate 18, and finally conducted to the radiating fins 24 through the vertical plate 20. The radiation from the radiating fins 24 warms the ambient air of the radiating fins 24, and the air is thereby expanded and warmed.

The expanded and warmed air rises between the adjacent radiating fins 24 toward the ceiling wall 1*c* of the housing case 1I. The air between the adjacent radiating fins 24 in a plurality of the radiating fins 24 is continuously warmed and rises.

The rising air which is warmed by the radiating fins 24 flows toward the front lens cover 4 along the ceiling wall 1*c* of the housing case 1I. That is, the convection of the warmed air is generated through the path composed of the ceiling wall 1*c* of the housing case 1I, the inside of the front lens cover 4, the bottom wall 1*a* of the housing case 1I and the radiating fins 24. Because the heat exchange between the outside atmosphere and the warmed air is performed at the front lens cover 4 when the motor vehicle drives, and the warmed air is cooled by the heat exchange, and the cooled air finally falls to the bottom wall 1*a* of the housing case 1I in the convection.

The surfaces of the radiating fins 24 have the highest temperature within the light chamber 6 because the heat energy generated by the light source 12 is conducted to the radiating fins 24. That is, the more the air is separated from the radiating fins 24, the more the temperature of the air is decreased. Temperature boundary layers are thereby formed around the radiating fins 24 in which the temperature of the air is gradually changed.

In accordance with the vibration of the control plate 100 when the motor vehicle is running, the inertia of the control plate 100 and the weights 112, and the urging force of the coil springs 108 vibrate the control plate 100 around the hinges 102, as designated by the along dashed double dotted lines in FIG. 19.

The air flow is generated by the vibration of the control plate 100 in the headlamp assembly. The vibration of the control plate 100 breaks and disturbs the temperature boundary layers in the air. The air of a low temperature is contacted to the surface of the radiating fins 24. Because there is a large temperature difference between the surfaces of the radiating fins 24 and the air of a low temperature, the heat exchange is progressed between them. The vibration of the control plate 100 promotes the radiating capability.

Further, the vibration of the control plate 100 generates the air flow toward the front side of the headlamp assembly. The air flow toward the front side cools the horizontal plate 18, the shade 10, the reflector 14, the projection lens 8, etc.

Still further, the control plate 100 according to the tenth embodiment has the same shape of the control plate 26 according to the first embodiment. Similar to the headlamp assembly according to the first embodiment previously described, the structure of the headlamp assembly according to the tenth embodiment thereby makes it possible to suppress the warmed air from falling along both the surfaces of the radiating fins 24 and the rear side of each of the radiating fins 24, and to make the convection flow of the warmed air along the circulation flow composed of the ceiling wall 1*c* of the housing case 1I, the inside of the front lens cover 4, and the bottom wall 1*a* of the housing case 1I. The structure of the headlamp assembly according to the tenth embodiment can improve the capability of radiating the heat energy generated by the light source 12.

The control plate 100 according to the tenth embodiment has the same size of the control plate 26 according to the first embodiment. However, the concept of the present invention is not limited by this structure. It is possible for the control plate to have a small size unless:

(1) the control plate 100 prevents the warmed air from falling along both the sides and the rear ends of the radiating fins 24; and (2) the vibration of the control plate 100 generates the air flow and breaks and disturbs the temperature boundary layers formed in the ambient air around the radiating fins 24 in order to promote the heat exchange.

Eleventh Embodiment

A description will be given of the headlamp assembly according to the eleventh embodiment of the present invention with reference to FIG. 21.

Figure 21:
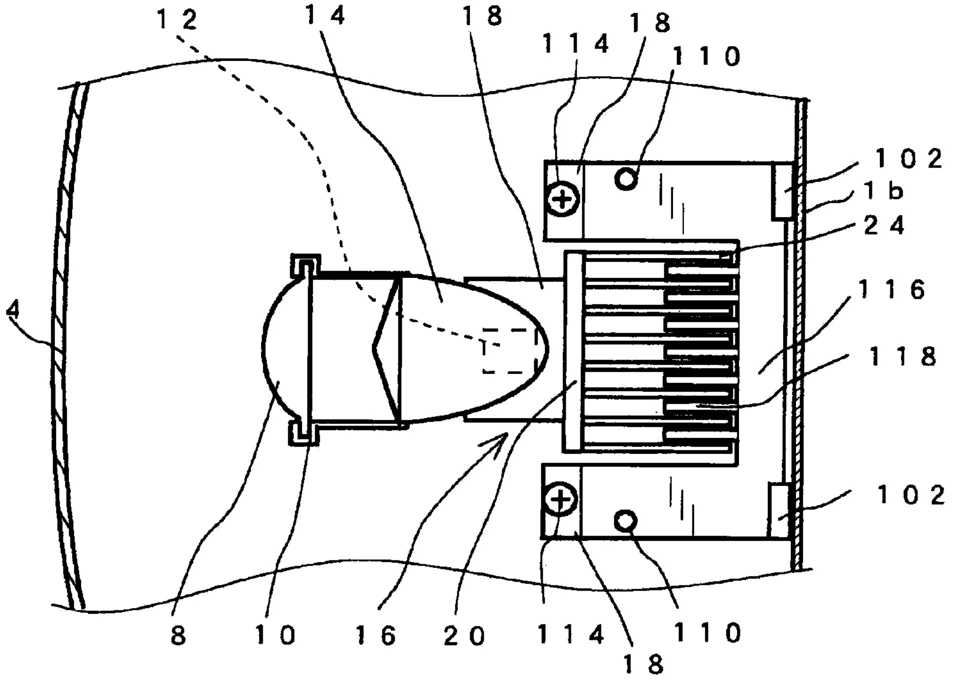
FIG. 21 is a schematic view showing a lateral cross section of a headlamp assembly according to an eleventh embodiment of the present invention.

FIG. 21 is a schematic view showing a lateral cross section of the headlamp assembly according to the eleventh embodiment of the present invention.

A control plate 116 according to the eleventh embodiment approximately has the same size of the control plate 100 according to the tenth embodiment. However, the control plate 116 according to the eleventh embodiment has a comb teeth part 118 having a comb-teeth shape.

The teeth of the comb teeth part 118 in the control plate 116 project between the adjacent radiating fins 24, and generate the air flow between the adjacent radiating fins 24 when the control plate 116 is vibrated. The generated air flow disturbs the temperature boundary layers and thereby promotes the heat exchange. It is preferable for the comb teeth part 118 to have the length which is approximately the half of the width of the radiating fins 24 in order to avoid the air flow between the adjacent radiating fins 24 from being disturbed.

Twelfth Embodiment

A description will be given of the headlamp assembly according to the twelfth embodiment of the present invention with reference to FIG. 22 and FIG. 23.

Figure 22:
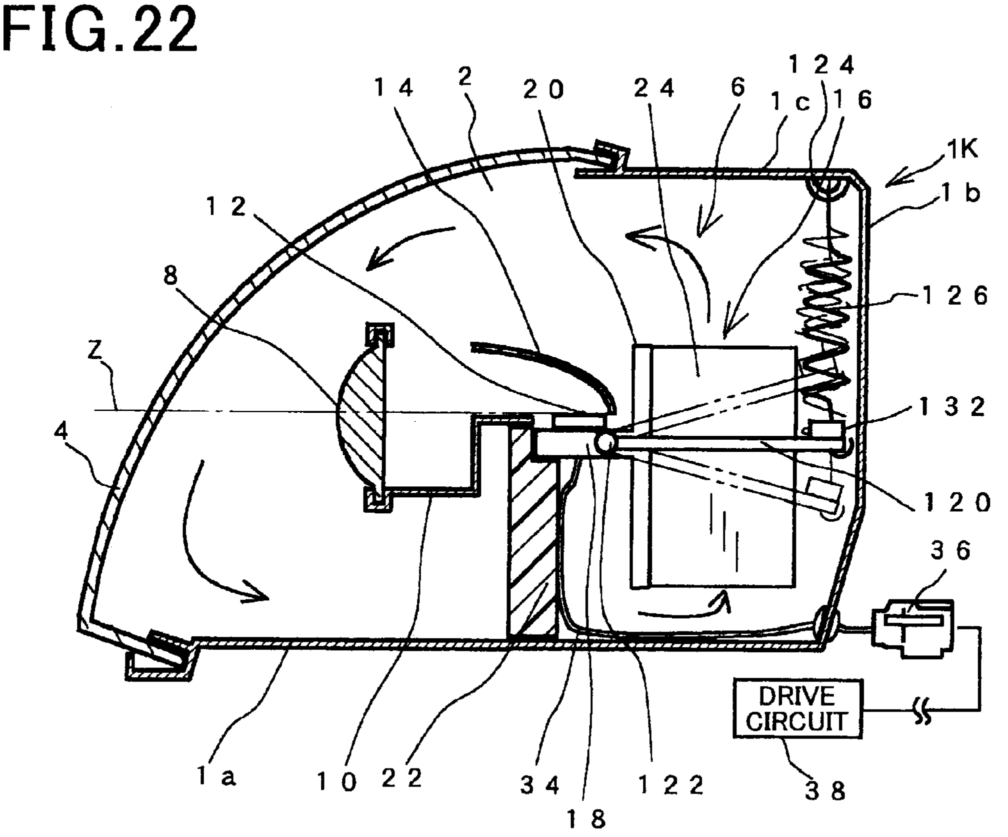
FIG. 22 is a schematic view showing a vertical cross section of a headlamp assembly mounted to a vehicle according to a twelfth embodiment of the present invention.

FIG. 22 is a schematic view showing a vertical cross section of the headlamp assembly mounted to a vehicle according to the twelfth embodiment of the present invention. FIG. 23 is a schematic view showing a lateral cross section of the headlamp assembly according to the twelfth embodiment shown in FIG. 22;

The control plate 120 according to the twelfth embodiment approximately has the same size of the control plate 100 according to the tenth embodiment. However, the control plate 120 according to the twelfth embodiment is movably supported to the side of the horizontal plate 18 by hinges 122 around the axis which crosses at a right angle to each of the radiating fins 24. That is, the hinges 122 attached to the side of the horizontal plate 18 support the control plate 120 around the axis which crosses at a right angle to each of the radiating fins 24.

Figure 23:
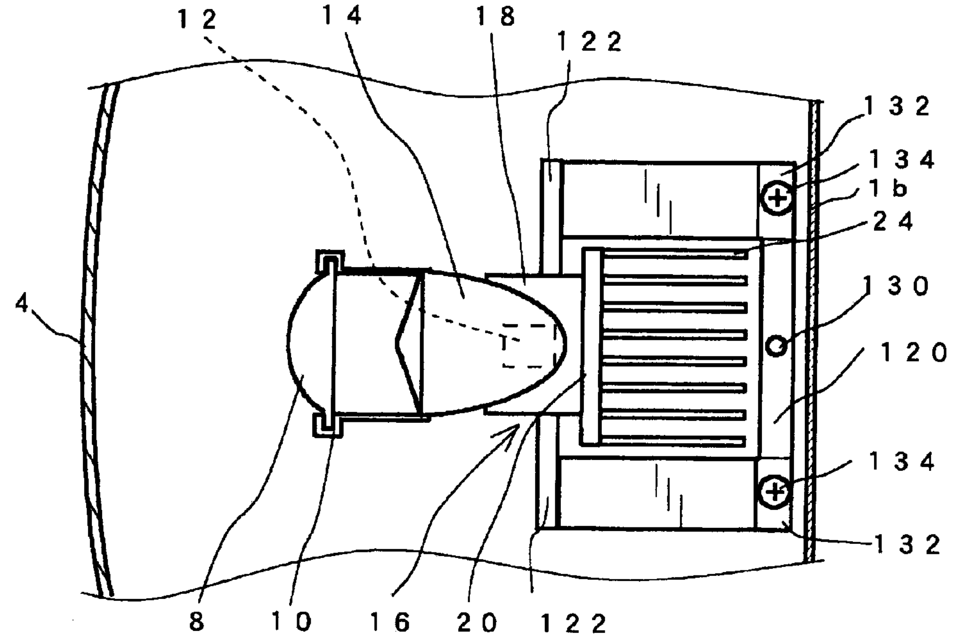
FIG. 23 is a schematic view showing a lateral cross section of the headlamp assembly according to the twelfth embodiment of the present invention shown in FIG. 22.

As shown in FIG. 22 and FIG. 23, a hook 124 is fixed onto the ceiling wall 1*c* of the housing case 1K. The hook 124 hangs a spring coil 126. A penetration hole 130 is formed in the control plat 120. That is, the spring coil 126 hangs the control plate 126 through the penetration hole 130 formed in the control plate 120 and the hook 124 fixed to the ceiling wall 1*c*.

Two weights 132 are fixed to the rear end of the control plate 120 by screws 134, which is opposite to the front end of the control plate 120 at which the hinges 122 are fixed. The urging force of the coil springs 126 and the weight of the control plate 120 and the weights 132 are balanced so that the control plate 120 is horizontally placed approximately crossing at a right angle to the radiating fins 24.

The urging force of the coil springs 126 and the weight of the control plate 120 and the two weights 132 are adjusted so that the control plate 120 is vertically vibrated around the axis of the hinges 122 when the motor vehicle drives.

In accordance with the vibration of the control plate 120 when the motor vehicle drives, the inertia of the control plate 120 and the weights 132, and the urging force of the coil springs 126 vibrate the control plate 120 around the hinges 122, as designated by the long dashed double dotted lines in FIG. 22.

The air flow is generated by the above vibration of the control plate 120 in the headlamp chamber. The vibration of the control plate 120 breaks and disturbs the temperature boundary layers in the ambient air around the radiating fins 24 in the control plate 120. The ambient air of a low temperature is contacted to the surface of the radiating fins 24. Because there is a large temperature difference between the surfaces of the radiating fins 24 and the ambient air of a low temperature, the heat exchange is progressed between them. The vibration of the control plate 120 promotes the radiating capability.

Because the vibration of the control plate 120 generates the air flow toward the rear side of the headlamp assembly according to the twelfth embodiment, the rear wall 1*b* and the ceiling wall 1*c* of the housing case 1K are thereby blown by the generated air flow.

The warmed air of a high temperature is thereby contacted to the rear wall 1*b* and the ceiling wall 1*c* of the housing case 1K. Because there is a large temperature difference between the warmed air and the rear wall 1*b* and the ceiling wall 1*c* of the housing case 1K, the heat exchange between them is promoted. This makes it possible to enhance the capability of radiating the heat energy of the warmed air in the light chamber 6 to the outside of the headlamp assembly.

Similar to the headlamp assembly according to the first embodiment previously described, the structure of the headlamp assemblies according to the twelfth embodiment also makes it possible to suppress the warmed air from falling along both the surfaces of the radiating fins 24 and the rear side of each of the radiating fins 24, and to make the convection flow of the warmed air along the circulation flow composed of the ceiling wall 1*c* of the housing case 1K, the inside of the front lens cover 4, and the bottom wall 1*a* of the housing case 1K. The structure of the headlamp assembly according to the twelfth embodiment can improve the radiating capability of the heat energy generated by the light source 12.

Thirteenth Embodiment

A description will be given of the headlamp assembly according to the thirteenth embodiment of the present invention with reference to FIG. 24, FIG. 25, and FIG. 26.

Figure 24:
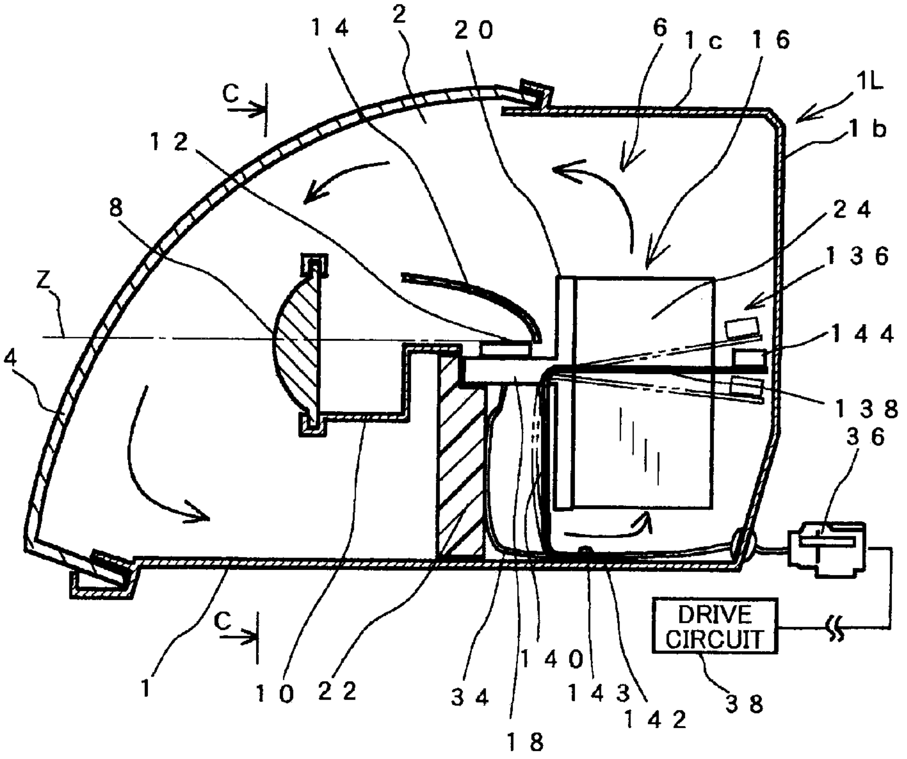
FIG. 24 is a schematic view showing a vertical cross section of a headlamp assembly mounted to a vehicle according to a thirteenth embodiment of the present invention.

FIG. 24 is a schematic view showing a vertical cross section of the headlamp assembly mounted to a vehicle according to the thirteenth embodiment of the present invention. FIG. 25 is a view showing a cross section of the headlamp assembly along the C-C line shown in FIG. 24. FIG. 26 is a schematic view showing a lateral cross section of the headlamp assembly according to the thirteenth embodiment shown in FIG. 24.

A control plate 136 in the headlamp assembly according to the thirteenth embodiment has the same shape of the control plate 100 according to the tenth embodiment. The control plate 136 according to the thirteenth embodiment is comprised of a control plate part 238, a pair of pole parts 140 and a part of fixing parts 142. As shown in FIG. 24 and FIG. 25, each of the pole parts 140 is bent at a right angle toward the bottom wall 1*a* side of the housing case 1L. Each of the fixing parts 142 are further bent at a right angle from the bottom side of the corresponding pole part 140 along the bottom wall 1*a* of the housing case 1L.

Figure 25:
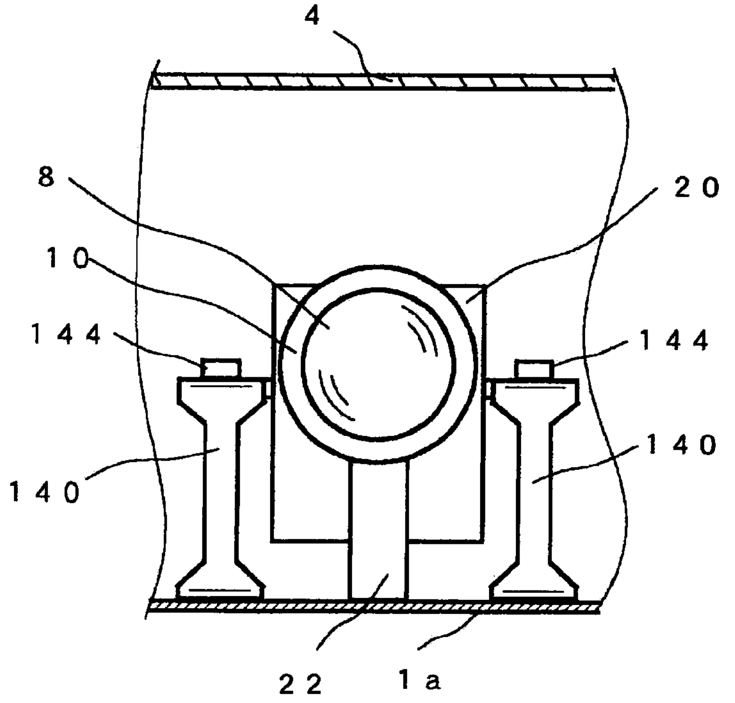
FIG. 25 is a view showing a cross section of the headlamp assembly along the C-C line shown in FIG. 24.
Figure 26:
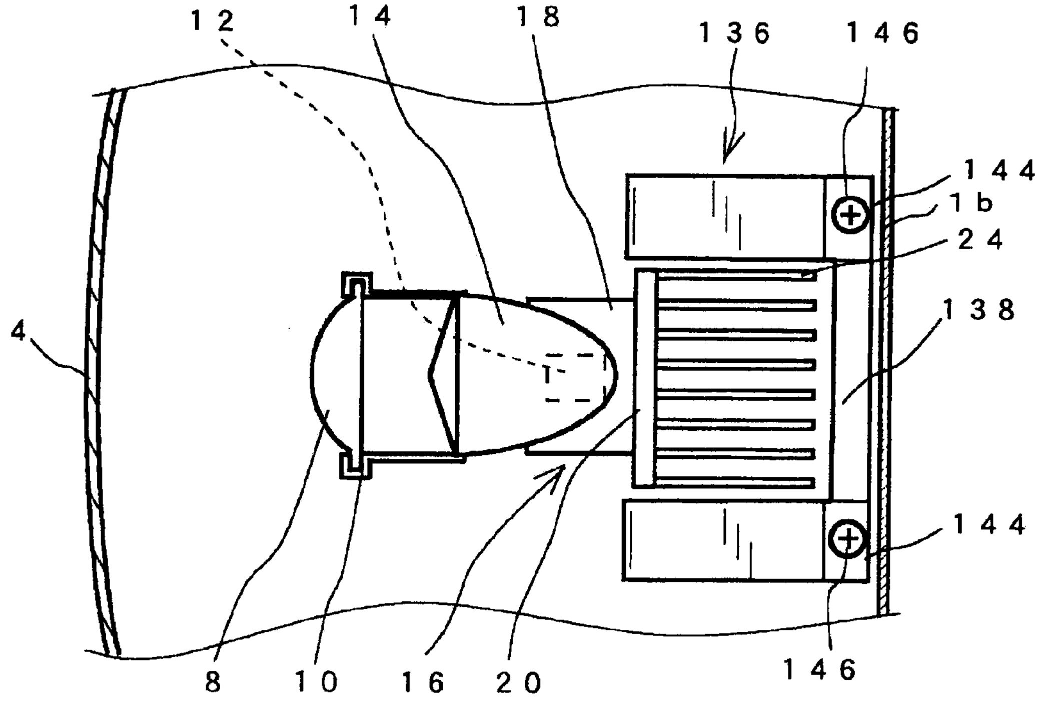
FIG. 26 is a schematic view showing a lateral cross section of the headlamp assembly according to the thirteenth embodiment of the present invention shown in FIG. 24.

As shown in FIG. 25, the pair of the pole parts 140 is bent at a right angle toward the bottom wall 1*a* side of the housing case 1L from the front end side of the control plate part 138 in the control plate 136. A gap between the pole parts 140 in the control plate 136 corresponds to the width of the vertical plate 20. The fixing parts 142 are fixed to the bottom wall 1*a* of the housing case 1L by screws 143. Two weights 144 are fixed onto the surface of the other end of the control plate 136 by screws 146, which is opposite to the fixing parts 142.

The control plate 136 is composed of a thin plate-like spring member. The urging force of the control plate 136 and the weight of the two weights 144 are balanced in order to horizontally place the control plate part 138 while the control plate part 138 crosses approximately at a right angle to the radiating fins 24. The urging force of the control plate 136 and the weight of the two weights 144 are adjusted in order to vertically vibrate the control plate part 138 according to the vibration generated when the motor vehicle drives.

As designated by the long dashed double dotted lines in FIG. 24, the air flow is generated by the vibration of the control plate 136 around the fixing parts 142 when the motor vehicle drives. The generated air flow disturbs the temperature boundary layers around the radiating fins 24. The air of a low temperature is thereby contacted onto the surface of the radiating fins 24. This promotes the heat exchange between them.

Because the vibration of the control plate 136 generates the air flow toward the rear side of the headlamp assembly according to the thirteenth embodiment, the rear wall 1*b* and the ceiling wall 1*c* of the housing case 1L are thereby blown by the generated air flow.

The warmed air of a high temperature is thereby contacted to the rear wall 1*b* and the ceiling wall 1*c* of the housing case 1L. Because there is a large temperature difference between the warmed air and the rear wall 1*b* and the ceiling wall 1*c* of the housing case 1L, the heat exchange between them is promoted. This makes it possible to enhance the capability of radiating the heat energy of the warmed air in the light chamber 6 to the outside of the headlamp assembly.

Similar to the headlamp assembly according to the first embodiment previously described, the structure of the headlamp assemblies according to the thirteenth embodiment also makes it possible to suppress the warmed air from falling along both the surfaces of the radiating fins 24 and the rear side of each of the radiating fins 24, and to make the convection of the warmed air along the circulation flow composed of the ceiling wall 1*c* of the housing case 1L, the inside of the front lens cover 4, and the bottom wall 1*a* of the housing case 1L. The structure of the headlamp assembly according to the thirteenth embodiment can improve the radiating capability of the heat energy generated by the light source 12.

Fourteenth Embodiment

A description will be given of the headlamp assembly according to the fourteenth embodiment of the present invention with reference to FIG. 27 and FIG. 28.

Figure 27:
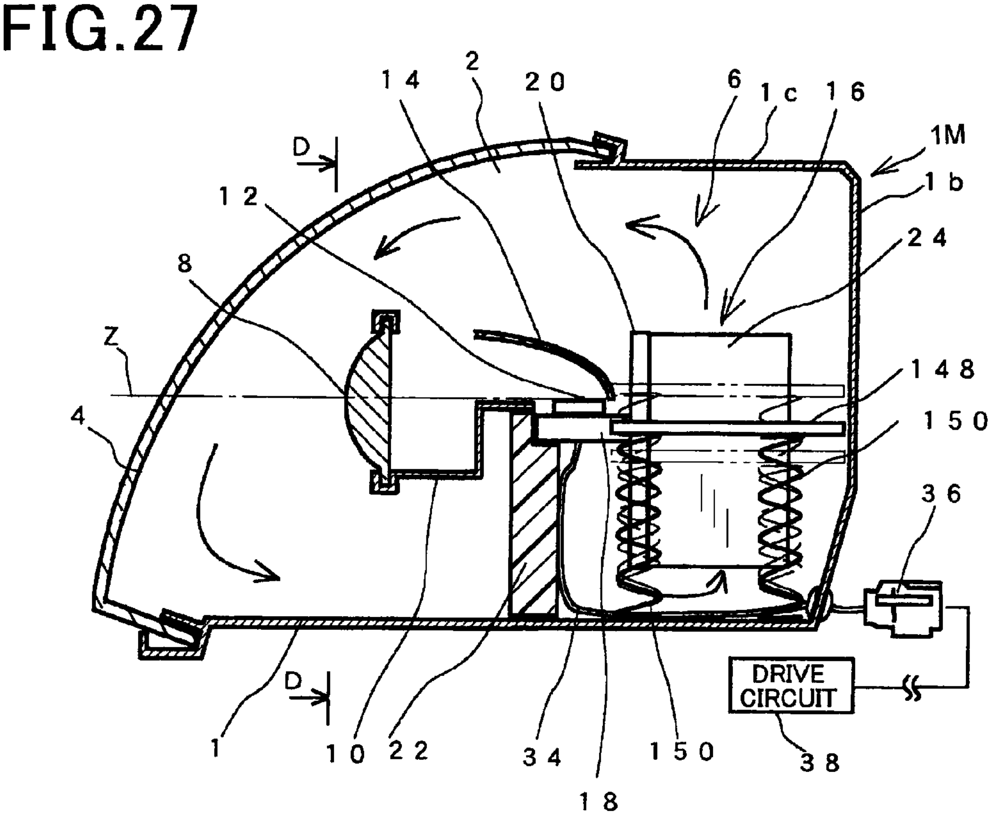
FIG. 27 is a schematic view showing a vertical cross section of a headlamp assembly mounted to a vehicle according to a fourteenth embodiment of the present invention.
Figure 28:
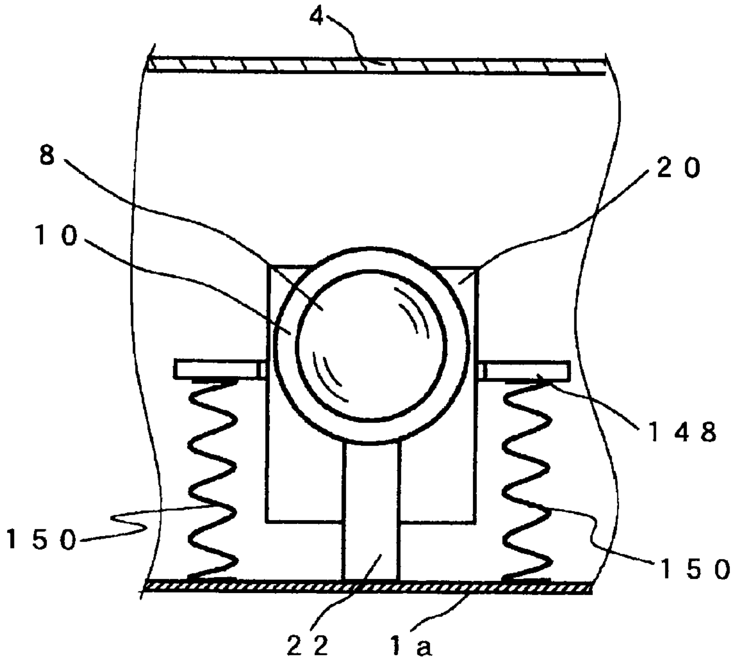
FIG. 28 is a view showing a cross section of the headlamp assembly along the D-D line shown in FIG. 27.

FIG. 27 is a schematic view showing a vertical cross section of the headlamp assembly mounted to a vehicle according to the fourteenth embodiment of the present invention. FIG. 28 is a view showing a cross section of the headlamp assembly along the D-D line shown in FIG. 27;

A control plate 148 in the headlamp assembly according to the fourteenth embodiment has approximately the same shape of the control plate 100 according to the tenth embodiment. In particular, coil springs 150 are placed between the corner parts at the rear surface of the control plate 148 and the bottom wall 1*a* of the housing case 1M.

The control plate 148 is supported by the urging force of the coil springs 150 so that the control plate 148 is approximately placed in parallel to the optical axis Z of the light emitted from the light source 12 and crosses approximately at a right angle to the radiating fins 24. That is, the control plate 148 is vertically vibrated by deformation of the coil springs 150.

As designated by the long dashed double dotted lines in FIG. 27, the air flow is generated by the vertical-vibration of the control plate 148 during the driving of the motor vehicle. The generated air flow breaks and disturbs the temperature boundary layers formed around the radiating fins 24. The air of a low temperature is thereby contacted onto the surface of the radiating fins 24. This promotes the heat exchange between them.

Similar to the headlamp assembly according to the first embodiment previously described, the structure of the headlamp assembly according to the fourteenth embodiment also makes it possible to suppress the warmed air from falling along both the surfaces of the radiating fins 24 and the rear side of each of the radiating fins 24, and to make the convection flow of the warmed air along the circulation flow composed of the ceiling wall 1*c* of the housing case 1M, the inside of the front lens cover 4, and the bottom wall 1*a* of the housing case 1M. The structure of the headlamp assembly according to the fourteenth embodiment can improve the radiating capability of the heat energy generated by the light source 12.

Fifteenth Embodiment

Figure 30:
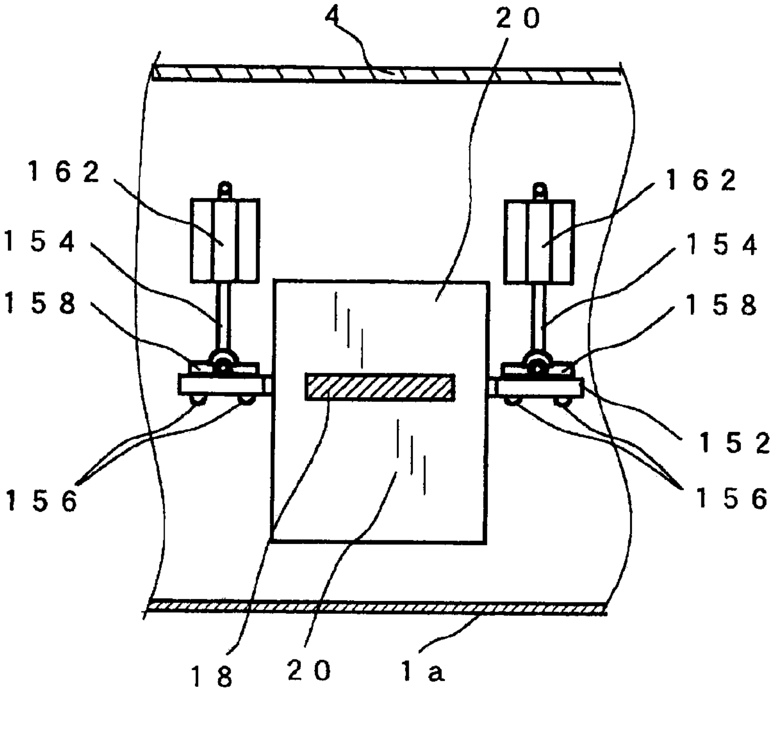
FIG. 30 is a view showing a cross section of the headlamp assembly along the E-E line shown in FIG. 29.
Figure 31:
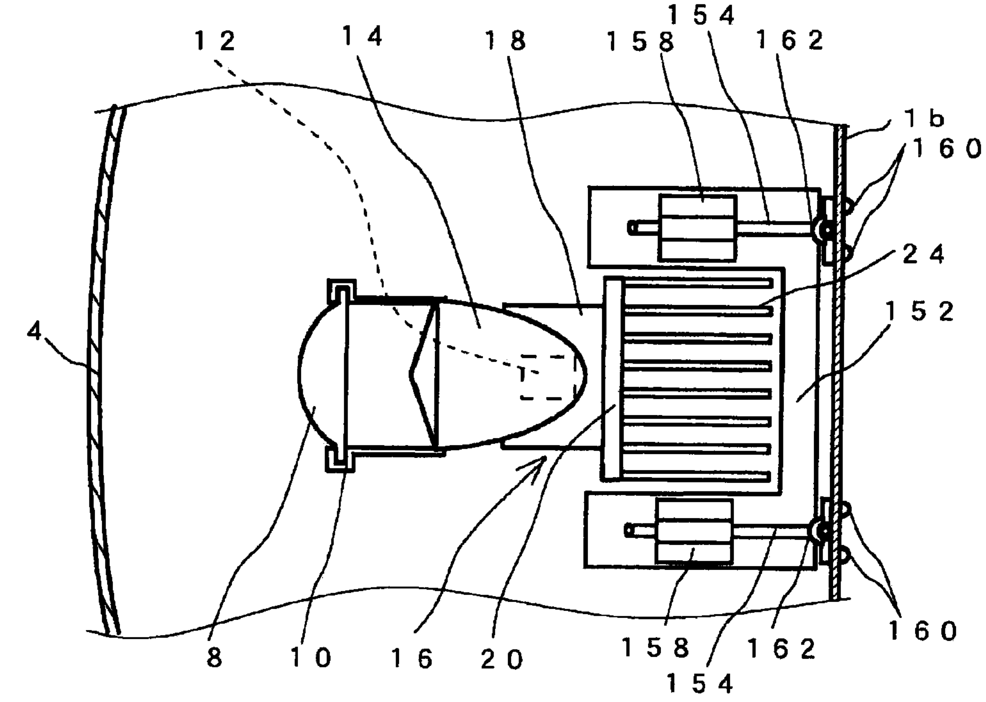
FIG. 31 is a schematic view showing a lateral cross section of the headlamp assembly according to the fifteenth embodiment of the present invention shown in FIG. 29.

A description will be given of the headlamp assembly according to the fifteenth embodiment of the present invention with reference to FIG. 29, FIG. 30 and FIG. 31.

Figure 29:
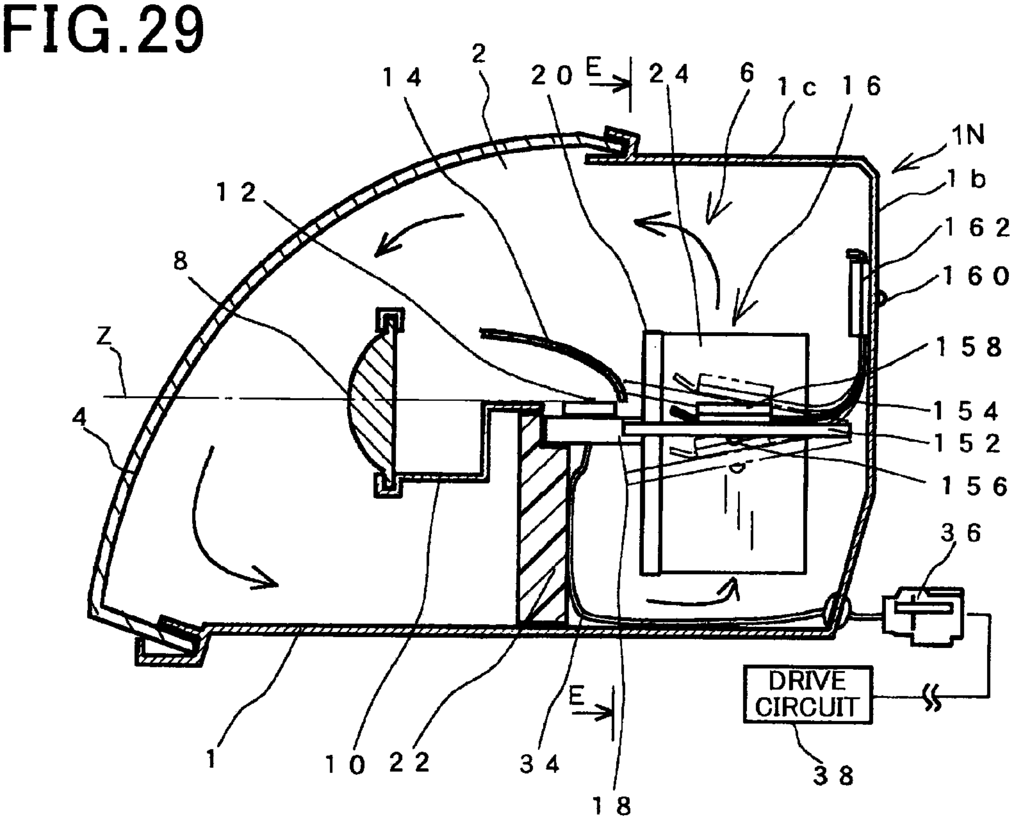
FIG. 29 is a schematic view showing a vertical cross section of a headlamp assembly mounted to a vehicle according to a fifteenth embodiment of the present invention.

FIG. 29 is a schematic view showing a vertical cross section of the headlamp assembly mounted to a vehicle according to the fifteenth embodiment of the present invention. FIG. 30 is a view showing a cross section of the headlamp assembly along the E-E line shown in FIG. 29. FIG. 31 is a schematic view showing a lateral cross section of the headlamp assembly according to the fifteenth embodiment shown in FIG. 29.

A control plate 152 in the headlamp assembly according to the fifteenth embodiment approximately has the same shape of the control plate 100 according to the tenth embodiment. As shown in FIG. 30, a pair of springs 154 is fixed to the control plate 152 by screws 156 through brackets 158 attached onto the surface of the control plate 152. Each of the springs 154 is made of spring wire member such as piano wire and is bent in L shape As designated by the long dashed double dotted lines in FIG. 29, the air flow is generated by the vertical-vibration of the control plate 152 when the motor vehicle drives. The generated air flow breaks and disturbs the temperature boundary layers formed around the radiating fins 24. The air of a low temperature is thereby contacted onto the surface of the radiating fins 24. This promotes the heat exchange between them, and improves the capability of radiating the heat energy of the warmed air to the outside of the light chamber 6 in the headlamp assembly.

Similar to the headlamp assembly according to the first embodiment previously described, the structure of the control plate 152 in the headlamp assembly according to the fifteenth embodiment also makes it possible to suppress the warmed air from falling along both the surfaces of the radiating fins 24 and the rear side of each of the radiating fins 24, and to make the convection flow of the warmed air along the circulation flow composed of the ceiling wall 1*c* of the housing case 1N, the inside of the front lens cover 4, and the bottom wall 1*a* of the housing case 1N. The structure of the headlamp assembly according to the fifteenth embodiment can improve the radiating capability of the heat energy generated by the light source 12.

Sixteenth Embodiment

A description will be given of the headlamp assembly according to the sixteenth embodiment of the present invention with reference to FIG. 32.

Figure 32:
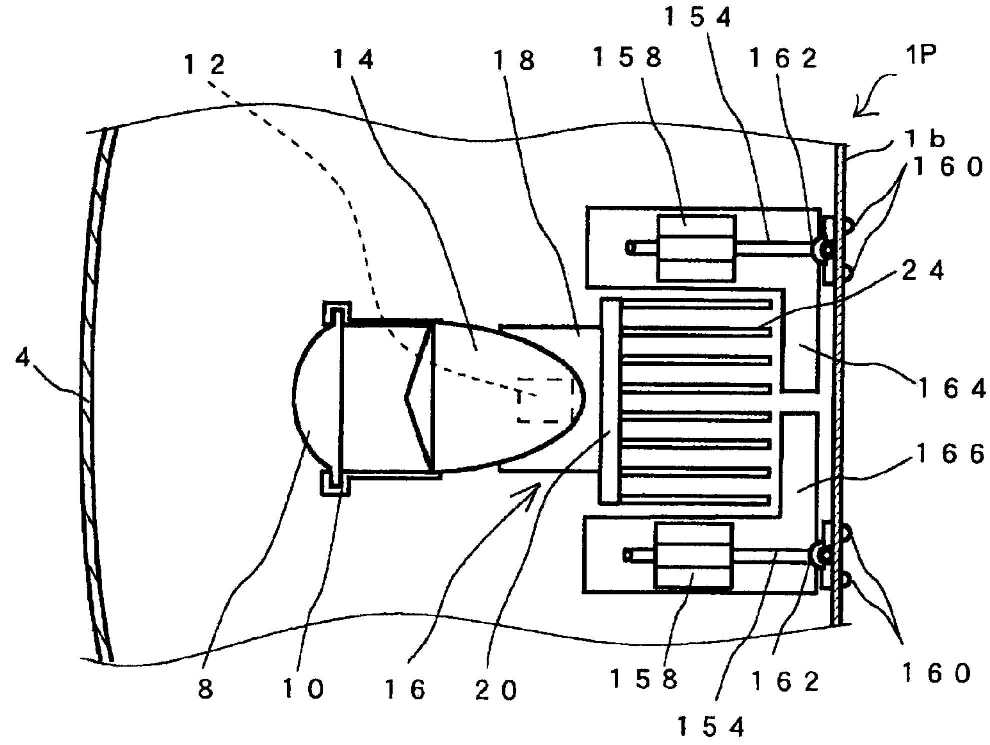
FIG. 32 is a schematic view showing a lateral cross section of a headlamp assembly according to a sixteenth embodiment of the present invention.

FIG. 32 is a schematic view showing a lateral cross section of the headlamp assembly according to the sixteenth embodiment of the present invention.

The headlamp assembly according to the sixteenth embodiment has control plates 164 and 166. The control plates 164 and 166 are obtained by dividing the control plate 152 according to the fifteenth embodiment at the central line thereof. Each of the control plates 164 and 166 is supported by the rear wall 1*b* of the housing case 1P through a wire spring 154.

Similar to the headlamp assembly according to the fifteenth embodiment previously described, the air flow is generated by the vertical-vibration of the control plates 164 and 166 during the driving of the motor vehicle. The generated air flow breaks and disturbs the temperature boundary layers formed around the radiating fins 24. The air of a low temperature is thereby contacted onto the surface of the radiating fins 24. This promotes the heat exchange between them. Accordingly, the structure of the headlamp assembly according to the sixteenth embodiment can improve the radiating capability of the heat energy generated by the light source 12.

Similar to the headlamp assembly according to the first embodiment previously described, the structure of the headlamp assembly according to the sixteenth embodiment also makes it possible to suppress the warmed air from falling along both the surfaces of the radiating fins 24 and the rear side of each of the radiating fins 24, and to make the convection of the warmed air along the circulation flow composed of the ceiling wall 1*c* of the housing case 1P, the inside of the front lens cover 4, and the bottom wall 1*a* of the housing case 1P. This structure of the headlamp assembly according to the sixteenth embodiment can improve the capability of radiating the heat energy of the warmed air to the outside.

Seventeenth Embodiment

A description will be given of the headlamp assembly according to the seventeenth embodiment of the present invention with reference to FIG. 33.

Figure 33:
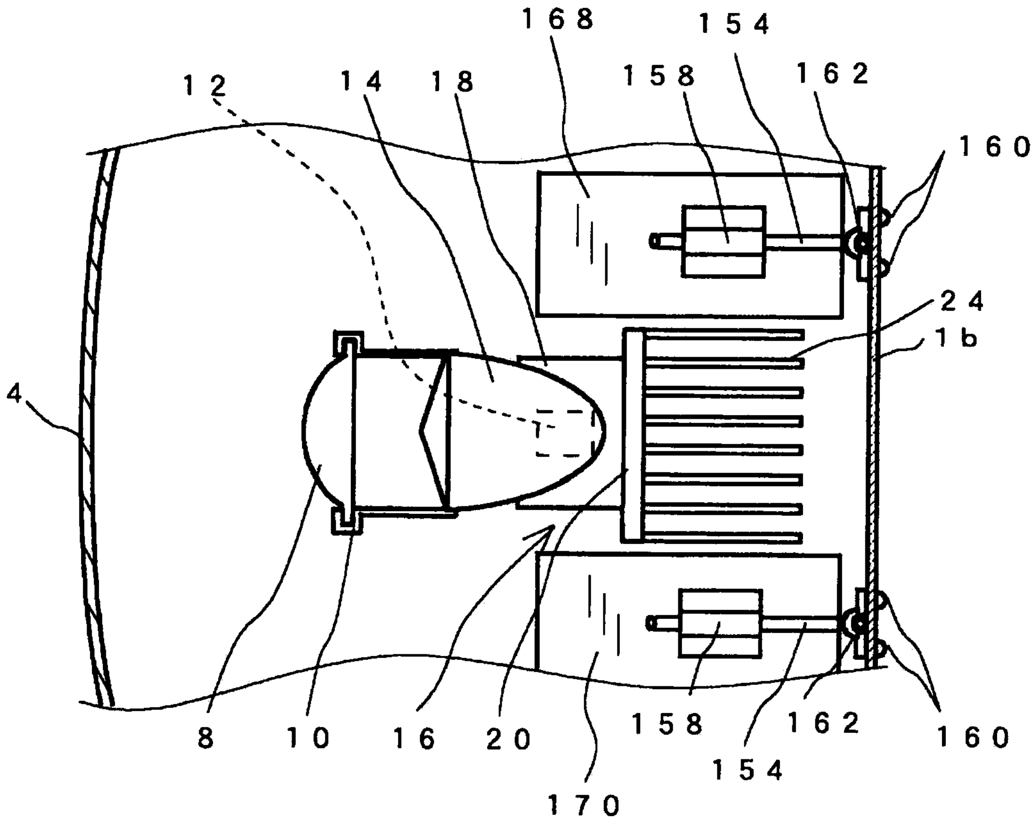
FIG. 33 is a schematic view showing a lateral cross section of a headlamp assembly according to a seventeenth embodiment of the present invention.

FIG. 33 is a schematic view showing a lateral cross section of the headlamp assembly according to the seventeenth embodiment of the present invention.

As shown in FIG. 33, the headlamp assembly according to the seventeenth embodiment has control plates 168 and 170. Each of the control plates 168 and 170 has a rectangular plate shape and placed at the rear side of the discharging fins 24. Similar to the structure of the control plates 164 and 166 according to the sixteenth embodiment, each of the control plates 168 and 170 according to the seventh embodiment is supported by and fixed to the rear wall 1*b* of the housing case 1 using a wire spring 154.

When compared with each of the control plates 164 and 166 according to the sixteenth embodiment, each of the control plates 168 and 170 according to the seventh embodiment has a large size in order to generate a large air flow by the vibration of the control plates 168 and 170 during the driving of the motor vehicle.

Similar to the headlamp assembly according to the fifteenth embodiment previously described, the air flow is generated by the vertical-vibration of the control plates 168 and 170 during the driving of the motor vehicle. The generated air flow breaks and disturbs the temperature boundary layers around the radiating fins 24. The air of a low temperature is thereby contacted onto the surface of the radiating fins 24. This promotes the heat exchange between them.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A headlamp assembly for a motor vehicle comprising:

a housing case, a front part of the housing case is open;

a lens cover fitted to the front part of the housing case, and the lens cover and the housing case forming a light chamber;

a light source, placed in the light chamber, for emitting light;

a reflector, placed in the light chamber, for reflecting the light emitted from the light source toward a front direction of the headlamp assembly, and the reflector being placed at a rear position of the light source and partially surrounding the light source;

a shade, placed in the light chamber, for cutting off a part of the light reflected by the reflector;

a projection lens, placed in the light chamber, for projecting the light reflected by the reflector toward the front direction of the headlamp assembly through the lens cover;

a radiating member, comprised of a plurality of radiating fins vertically placed in the light chamber, for radiating heat energy generated by the light source, each of the radiating fins having a plate shape; and a control plate placed in the light chamber and approximately crossing at a right angle to the radiating fins, and the projection lens, the shade, and the light source being arranged in order from a front end of the headlamp assembly along an axial direction of the light source; wherein the control plate is arranged around an outer periphery of the radiating fins, and has a size which is capable of suppressing a convection of ambient air around the radiating fins; and the radiating fins extend through an aperture defined by the control plate.

2. The headlamp assembly according to claim 1, wherein the control plate is fixed to one of the housing case and the radiating member.

3. The headlamp assembly according to claim 1, further comprising a drive circuit for controlling the supply of electric power to the light source.

4. The headlamp assembly according to claim 1, further comprising a drive circuit for controlling the supply of electric power to the light source, wherein the control plate has a hollow box shape, and the control device is placed in the control plate having the hollow box shape.

5. The headlamp assembly according to claim 1, wherein the control plate is fixed to one of the radiating member, the shade and the reflector, and a rear part of the control plate has an arc shape.

6. The headlamp assembly according to claim 5, wherein the housing case has an auxiliary control plate which is placed in parallel to the control plate and is overlapped with the rear end of the control plate.

7. The headlamp assembly according to claim 1, wherein the control plate and one of the shade, the reflector and the housing case are assembled in one body.

8. The headlamp assembly according to claim 7, wherein the light source and a power source are electrically connected through leading wires, and penetration holes are formed in the control plate through which the leading wires are placed.

9. The headlamp assembly according to claim 7, wherein the light source and a power source are electrically connected through leading wires, and the leading wires are supported by clamp members.

10. The headlamp assembly according to claim 1, wherein the control plate is movably supported by at least one of springs.

11. The headlamp assembly according to claim 10, wherein the control plate is vibratory supported by using hinges, and weights are attached on a position of the control plate which is opposite to the hinges, and springs are attached onto the control plate in order to support the control plate so that the control plate approximately crosses at a right angle to the radiating fins.

12. The headlamp assembly according to claim 10, wherein the control plate is composed of thin spring plates, and one end of the control plate is fixed and weights are attached onto the other end of the control plate.

13. The headlamp assembly according to claim 10, wherein a plurality of coil springs is placed between the control plate and the housing case, and the control plate approximately crosses at a right angle to the radiating fins.

14. The headlamp assembly according to claim 10, wherein one end of a wire spring is attached to the control plate and the other end of the wire spring is fixed to the housing case so that the control plate approximately crosses at a right angle to the radiating fins.

15. A headlamp assembly for a motor vehicle comprising:

a housing case, a front part of the housing case is open;

a lens cover fitted to the front part of the housing case, and the lens cover and the housing case forming a light chamber;

a light source, placed in the light chamber, for emitting light;

a reflector, placed in the light chamber, for reflecting the light emitted from the light source toward a front direction of the headlamp assembly, and the reflector being placed at a rear position of the light source and partially surrounding the light source;

a shade, placed in the light chamber, for cutting off a part of the light reflected by the reflector;

a projection lens, placed in the light chamber, for projecting the light reflected by the reflector toward the front direction of the headlamp assembly through the lens cover;

a radiating member, comprised of a plurality of radiating fins vertically placed in the light chamber, for radiating heat energy generated by the light source, each of the radiating fins having a plate shape; and a control plate placed in the light chamber and approximately crossing at a right angle to the radiating fins, and the projection lens, the shade, and the light source being arranged in order from a front end of the headlamp assembly along an axial direction of the light source; wherein the control plate is arranged around an outer periphery of the radiating fins, and has a size which is capable of suppressing a convection of ambient air around the radiating fins; and a first portion of each of the radiating fins extends toward a ceiling wall of the housing case from the control plate and a second portion of each of the radiating fins extends toward a bottom wall of the housing case from the control plate.

16. The headlamp assembly according to claim 15, wherein the control plate is fixed to one of the housing case and the radiating member.

* * * * *